(12) United States Patent
Wachsman et al.

(10) Patent No.: US 9,525,179 B2
(45) Date of Patent: Dec. 20, 2016

(54) CERAMIC ANODE MATERIALS FOR SOLID OXIDE FUEL CELLS

(71) Applicant: University of Maryland, College Park, College Park, MD (US)

(72) Inventors: Eric D. Wachsman, Fulton, MD (US); Ke-Ji Pan, College Park, MD (US); Colin Gore, Riverdale, MD (US); Mohammed Hussain Abdul Jabbar, College Park, MD (US); Hee Sung Yoon, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 94 days.

(21) Appl. No.: 14/207,403

(22) Filed: Mar. 12, 2014

(65) Prior Publication Data
US 2014/0302420 A1    Oct. 9, 2014

Related U.S. Application Data

(60) Provisional application No. 61/780,113, filed on Mar. 13, 2013.

(51) Int. Cl.
*H01M 4/48* (2010.01)
*H01M 4/90* (2006.01)
*H01M 8/12* (2016.01)

(52) U.S. Cl.
CPC ... *H01M 4/9033* (2013.01); *H01M 2008/1293* (2013.01); *Y02E 60/50* (2013.01); *Y02E 60/525* (2013.01)

(58) Field of Classification Search
CPC .......................... H01M 4/9033; Y02E 60/525
See application file for complete search history.

(56) References Cited

U.S. PATENT DOCUMENTS

| | | |
|---|---|---|
| 7,468,218 B2 | 12/2008 | Marina et al. |
| 2004/0265669 A1 | 12/2004 | Yoo et al. |
| 2005/0058009 A1 | 3/2005 | Yang et al. |

(Continued)

FOREIGN PATENT DOCUMENTS

| | | |
|---|---|---|
| CN | 102593480 A | 7/2012 |
| EP | 2031675 A1 | 3/2009 |

(Continued)

OTHER PUBLICATIONS

Smith, Brandon H., "Development of Solid Oxide Fuel Cell Electrodes with High Conductivity and Enhanced Redox Stability" (2010), Master's Theses, Paper 32.*

(Continued)

*Primary Examiner* — Jonathan Jelsma
(74) *Attorney, Agent, or Firm* — Sterne, Kessler, Goldstein & Fox P.L.L.C.

(57) ABSTRACT

Novel anode materials including various compositions of vanadium-doped strontium titanate (SVT), and various compositions of vanadium- and sodium-doped strontium niobate (SNNV) for low- or intermediate-temperature solid oxide fuel cell (SOFCs). These materials offer high conductivity achievable at intermediate and low temperatures and can be used as the structural support of the SOFC anode and/or as the conductive phase of an anode. A method of making a low- or intermediate-temperature SOFC having an anode layer including SVT or SNNV is also provided.

20 Claims, 28 Drawing Sheets

(56) References Cited

U.S. PATENT DOCUMENTS

2009/0061284 A1 3/2009 Blennow et al.
2012/0037499 A1 2/2012 Mogensen et al.
2013/0122393 A1* 5/2013 Liu .................... H01M 8/2465
429/468

FOREIGN PATENT DOCUMENTS

JP 09165262 A * 6/1997
JP 2002012427 A * 1/2002

OTHER PUBLICATIONS

Notification of Transmittal of the International Search Report and the Written Opinion of the International Searching Authority, or the Declaration issued in International Appl. No. PCT/US2014/026637, mailed on Apr. 1, 2015.
Fontaine et al., Novel High Temperature Proton Conducting Fuel Cells: Production of La0.995Sr0.005NbO4-0 Electrolyte Thin Films and Compatible Cathode Architectures, Journal of Power Sources, vol. 188, No. 1, Oct. 17, 2008, pp. 106-113.
Extended European Search Report issued in European Patent Appl. No. 14776172.0, mailed Nov. 2, 2016, 8 pages.

* cited by examiner

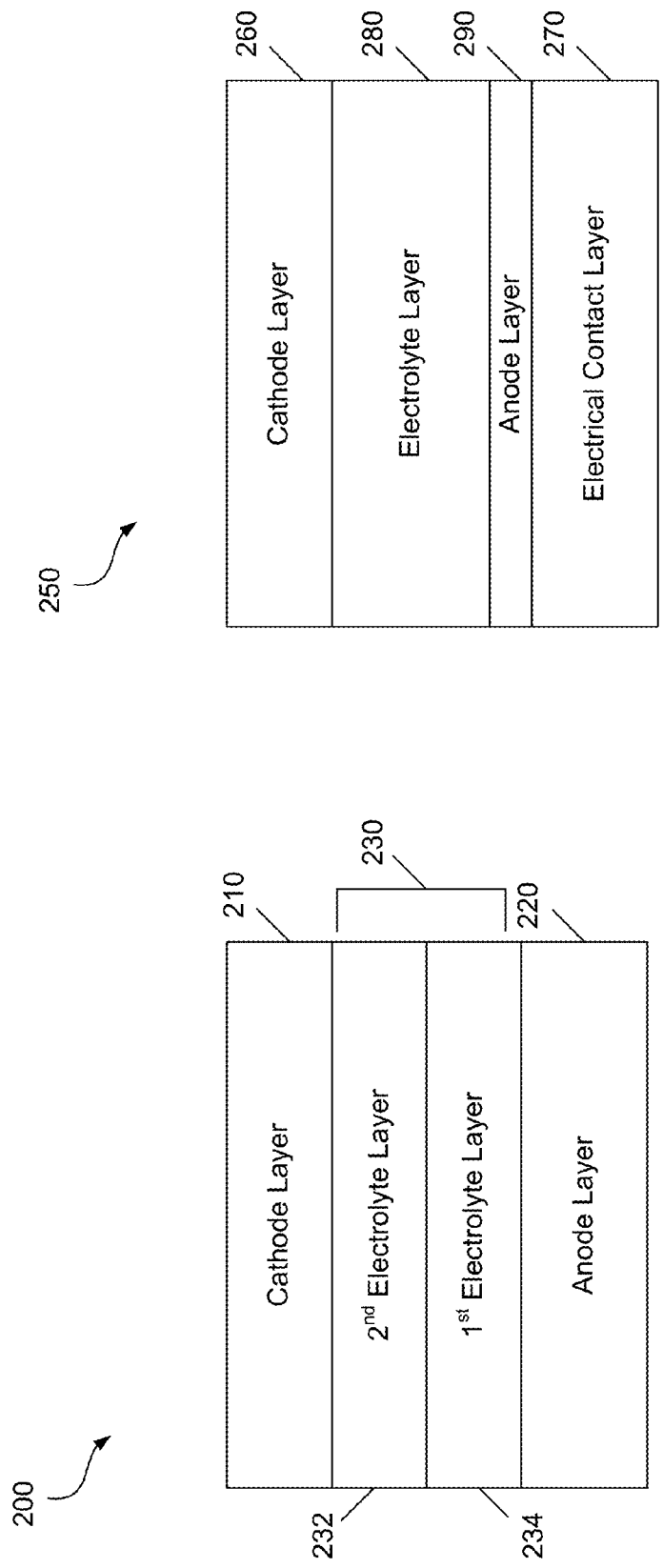

FIG. 6

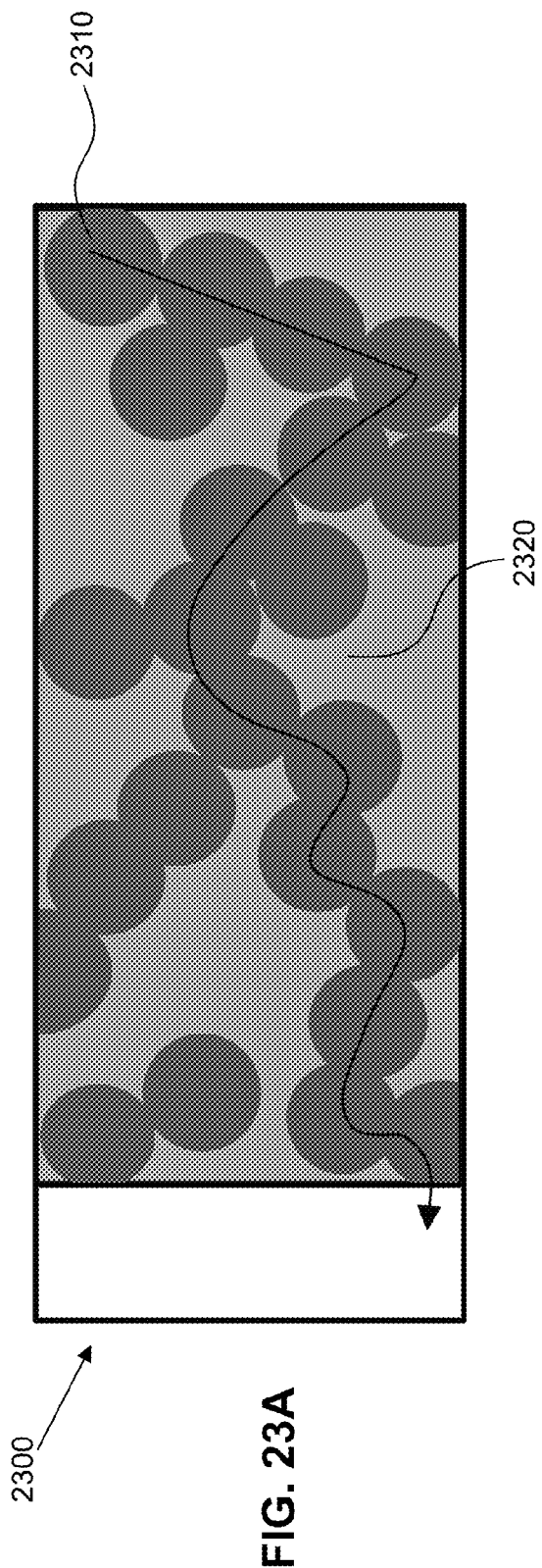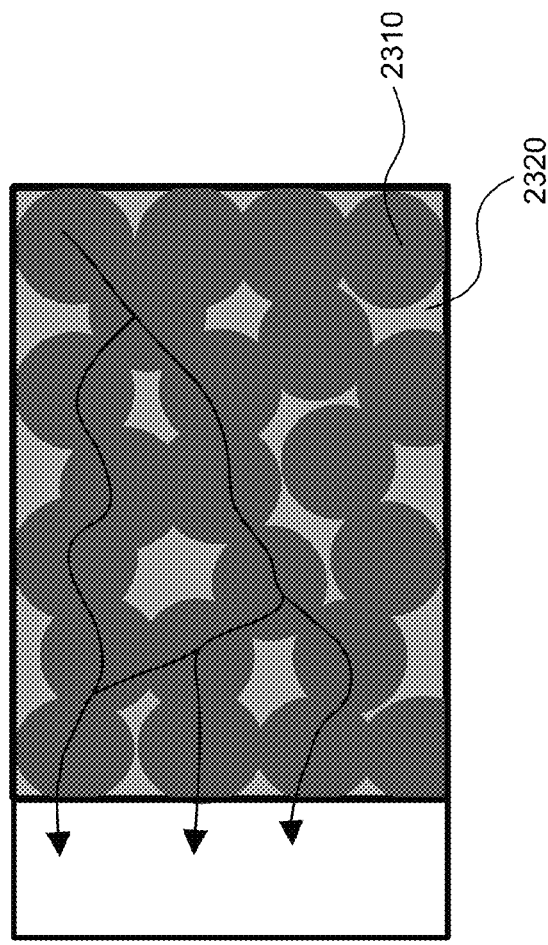
FIG. 23A
FIG. 23B

CERAMIC ANODE MATERIALS FOR SOLID OXIDE FUEL CELLS

CROSS-REFERENCE TO RELATED APPLICATIONS

This application claims priority to U.S. Provisional Patent Application Ser. No. 61/780,113, titled "A New SOFC Anode Material Based on Vanadium-doped Strontium Titanate," filed Mar. 13, 2013, which is hereby incorporated by reference in its entirety.

FIELD OF THE INVENTION

This invention relates to solid oxide fuel cell (SOFC) anode materials that comprise various compositions of vanadium-doped strontium titanate (SVT), and various compositions of vanadium- and sodium-doped strontium niobate (SNNV). These materials offer high conductivity achievable at intermediate and low temperatures and can be used as the structural support of the SOFC anode and/or as the conductive phase of an anode.

BACKGROUND

For traditional SOFC anode materials, porous Ni—YSZ or Ni-GDC composites are often fabricated to achieve both high ionic conductivity and high electronic conductivity. However, even though nickel is highly electronically conductive and catalytically active, there are problems with it, such as volume change during thermal and reduction-oxidation cycling, carbon deposition when using hydrocarbon fuels, and low sulfur tolerance. Considering these issues, electronically conductive ceramics offer a promising alternative to nickel-based anodes. Nevertheless, the conductivity of electronically conductive ceramics is much lower than nickel, which is deleterious to the performance of SOFCs.

Others have developed all-ceramic anode materials with acceptable conductivity for SOFCs. Such anode materials include niobium doped strontium titanate (SNT), which can have good electronic conductivity (~6.5 S-cm$^{-1}$) after reduction at ~930° C. and shows good reduction-oxidation stability. SNT and alternative conductive ceramics for SOFC anodes require conductivity activation by high temperature sintering of the material in a reducing environment or in-situ reduction at high temperatures. However, neither of these options is feasible for intermediate or low-temperature SOFCs. As such, there is a need for an improved low temperature anode material for use within solid oxide fuel cells. There is a need for new electronically conductive ceramic materials that meet both the conductivity and stability requirements of the anode and are compatible with intermediate- and low-temperature operation.

SUMMARY OF THE INVENTION

Some embodiments include a solid-oxide fuel cell having a cathode layer; an electrolyte layer; and an anode layer. The anode layer including an oxide material selected from the group consisting of vanadium doped strontium titanate and vanadium- and sodium-doped strontium niobate.

In some embodiments, the anode layer is configured to allow electron percolation through the oxide material selected from the group consisting of vanadium doped strontium titanate and vanadium- and sodium-doped strontium niobate.

In some embodiments, the oxide material is vanadium doped strontium titanate. In some embodiments, the vanadium doped strontium titanate has the formula: $Sr_xV_yTi_{1-y}O_{3\pm\delta}$; where the portions of x and y are within the following ranges: $1.0 \geq x \geq 0.80$; $0.10 \leq y \leq 0.40$; and $0 \leq \delta \leq 1.5$.

In some embodiments, the vanadium doped strontium titanate is doped with 10 to 40 at % vanadium at the titanium site. In some embodiments, the vanadium doped strontium titanate is doped with 25 to 40 at % vanadium at the titanium site. In some embodiments, the vanadium doped strontium titanate is doped with 30 to 40 at % vanadium at the titanium site.

In some embodiments, the oxide material is vanadium- and sodium-doped strontium niobate. In some embodiments, the vanadium- and sodium-doped strontium niobate has the formula: $Sr_{0.2}Na_{0.8}Nb_{1-x}V_xO_{3\pm\delta}$; where x is within the following range $0.10 \leq x \leq 0.30$; and $0 \leq \delta \leq 1.5$.

In some embodiments, the vanadium- and sodium-doped strontium niobate is doped with 10 to 30 at % vanadium at the niobium site. In some embodiments, the vanadium- and sodium-doped strontium niobate is doped with 20 to 30 at % vanadium at the niobium site.

In some embodiments, the cathode layer includes a composite including a material selected from the group consisting of: lanthanum strontium cobalt iron oxide (LSCF), barium strontium cobalt iron oxide (BSCF), samarium strontium cobalt iron oxide (SSCF), lanthanum strontium manganate (LSM); and a material selected from the group consisting of: yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), dysprosium tungsten stabilized bismuth oxide (DWSB), yttria stabilized bismuth oxide (YSB), strontium and magnesium doped lanthanum gallate (LSGM).

In some embodiments, the anode layer including vanadium doped strontium titanate has a conductivity of at least 10 S*cm$^{-1}$ when reduced at a temperature less than 850° C. In some embodiments, the anode layer including vanadium doped strontium titanate has a conductivity of at least 10 S*cm$^{-1}$ when reduced at a temperature less than 650° C. In some embodiments, the anode layer including vanadium doped strontium titanate has a conductivity of at least 30 S*cm$^{-1}$ when reduced at a temperature less than 850° C. In some embodiments, the anode layer including vanadium doped strontium titanate has a conductivity of at least 30 S*cm$^{-1}$ when reduced at a temperature less than 650° C.

In some embodiments, the anode layer including vanadium- and sodium-doped strontium niobate has a conductivity of at least 100 S*cm$^{-1}$ when reduced at a temperature of less than 650° C. In some embodiments, the anode layer including vanadium- and sodium-doped strontium niobate has a conductivity of at least 250 S*cm$^{-1}$ when reduced at a temperature of less than 650° C.

In some embodiments, the solid oxide fuel cell also includes a barrier layer disposed between the electrolyte layer and the anode layer, the barrier layer configured to block migration of a material from the anode layer, the material selected from the group consisting of: vanadium, sodium, or combinations thereof. In some embodiments, the barrier layer includes a perovskite type oxide or metal oxide. In some embodiments, the barrier layer includes strontium oxide. In some embodiments, the barrier layer includes strontium titanate. In some embodiments, the barrier layer includes a composite selected from the group consisting of:

a nickel-GDC composite, a nickel-yttria stabilized zirconia composite, and a nickel-niobium doped strontium titanate composite.

In some embodiments, the anode layer includes only oxide materials. In some embodiments, the anode layer is porous.

In some embodiments, the anode layer also includes GDC.

In some embodiments, the crystal structure of the anode layer is perovskite.

In some embodiments, the anode layer comprises a composite including niobium doped strontium titanate; and the oxide material selected from the group consisting of vanadium doped strontium titanate and vanadium- and sodium-doped strontium niobate; where the niobium doped strontium titanate is configured to block migration of a material from the anode layer, the material selected from the group consisting of: vanadium, sodium, or combinations thereof.

In some embodiments, the anode layer is infiltrated with Ni or Ni-GDC.

Some embodiments include an oxide having the composition: $Sr_xV_yTi_{1-y}O_{3\pm\epsilon}$; where the portions of x and y are within the following ranges: $1.0 \geq x \geq 0.80$: $0.10 \leq y \leq 0.40$; and $0 \leq \delta \leq 1.5$. In some embodiments, y is within the range: $0.25 \leq y \leq 0.40$. In some embodiments, y is within the range: $0.25 \leq y \leq 0.40$.

Some embodiments include an oxide having the composition: $Sr_{0.2}Na_{0.8}Nb_{1-x}V_xO_{3\pm\delta}$; where x is within the following range: $0.10 \leq x \leq 0.30$; and $0 \leq \delta \leq 1.5$. In some embodiments, x is within the range: $0.20 \leq x \leq 0.30$.

In some embodiments, the crystal structure of the oxide composition is perovskite.

Some embodiments include a method of making a low temperature solid-oxide fuel cell including a cathode layer; an electrolyte layer; and an anode layer, the anode layer including an oxide material selected from the group consisting of vanadium doped strontium titanate and vanadium- and sodium-doped strontium niobate. The method including: fabricating the cathode layer, the electrolyte layer and the anode layer, thereby forming a complete cell. After fabricating, reducing the anode layer of the complete cell at a temperature between 300° C. and 850° C.; where the temperature of any subsequent fabrication steps, and the operating temperature of the solid oxide fuel cell, does not exceed 850° C.

In some embodiments, the anode layer is reduced at a temperature between 500° C. and 650° C., and the temperature of any subsequent fabrication steps, and the operating temperature of the solid oxide fuel cell, does not exceed 650° C.

In some embodiments, at least one an additional layer is fabricated with the cathode layer, the electrode layer and the anode layer to form the complete cell; and after fabricating the complete cell, the anode layer is reduced at a temperature between 300° C. and 850° C. in the presence of the at least one additional layer, the cathode layer and the electrolyte layer; where the temperature of any subsequent fabrication steps, and the operating temperature of the solid oxide fuel cell, does not exceed 850° C.

Some embodiments include a solid-oxide fuel cell including a cathode layer; an electrolyte layer; and an anode layer, the anode layer comprising an oxide material doped with vanadium; where the crystal structure of the anode layer is perovskite.

BRIEF DESCRIPTION OF THE DRAWINGS

FIG. 2A shows a fuel cell according to one embodiment. FIG. 2B shows a fuel cell according to one embodiment.

FIG. 6 shows x-ray patterns for SNNV with different vanadium doping levels according to some embodiments.

FIGS. 23A and 23B illustrate electron percolation through a composite material.

DETAILED DESCRIPTION

This specification discloses one or more embodiments that incorporate the features of this invention. The disclosed embodiment(s) merely exemplify the invention. The scope of the invention is not limited to the disclosed embodiment(s). Multiple inventions may be described. The invention is defined by the claims appended hereto.

The embodiment(s) described, and references in the specification to "one embodiment", "an embodiment", "an example embodiment", etc., indicate that the embodiment(s)

described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, that feature, structure, or characteristic may be used in connection with features, structures, or characteristics of other embodiments whether or not explicitly described.

As used herein, "electron percolation" means the transport of an electron through a material. In cases wherein an electron percolates through a single material, such as SVT, electron percolation means that there is a path for the electron through a layer using that material only. For example, if a composite material has a first material and a second material and electrons percolate through the first material, this means that electrons do not have to pass through the second material when moving through the composite. FIGS. 23A and 23B provide a visual explanation of electron percolation.

As used herein, "operating temperature" means the operating temperature of the fuel cell during steady state operation. Preferably, the operating temperature of a fuel cell is the optimal operating temperature that results in the most efficient fuel cell operation based on the fuel cell's structure and materials used to form the fuel cell, i.e. the materials of the anode layer, electrolyte layer(s), cathode layer, etc.

As used herein, "reduction" or "reducing" means the process of removing oxygen from a material, such as an anode layer, at a reduction temperature and in the presence of a reducing atmosphere having a low oxygen partial pressure, such as an $H_2$ atmosphere, H2 and nitrogen atmosphere, or another inter gas atmosphere.

Figure 1:
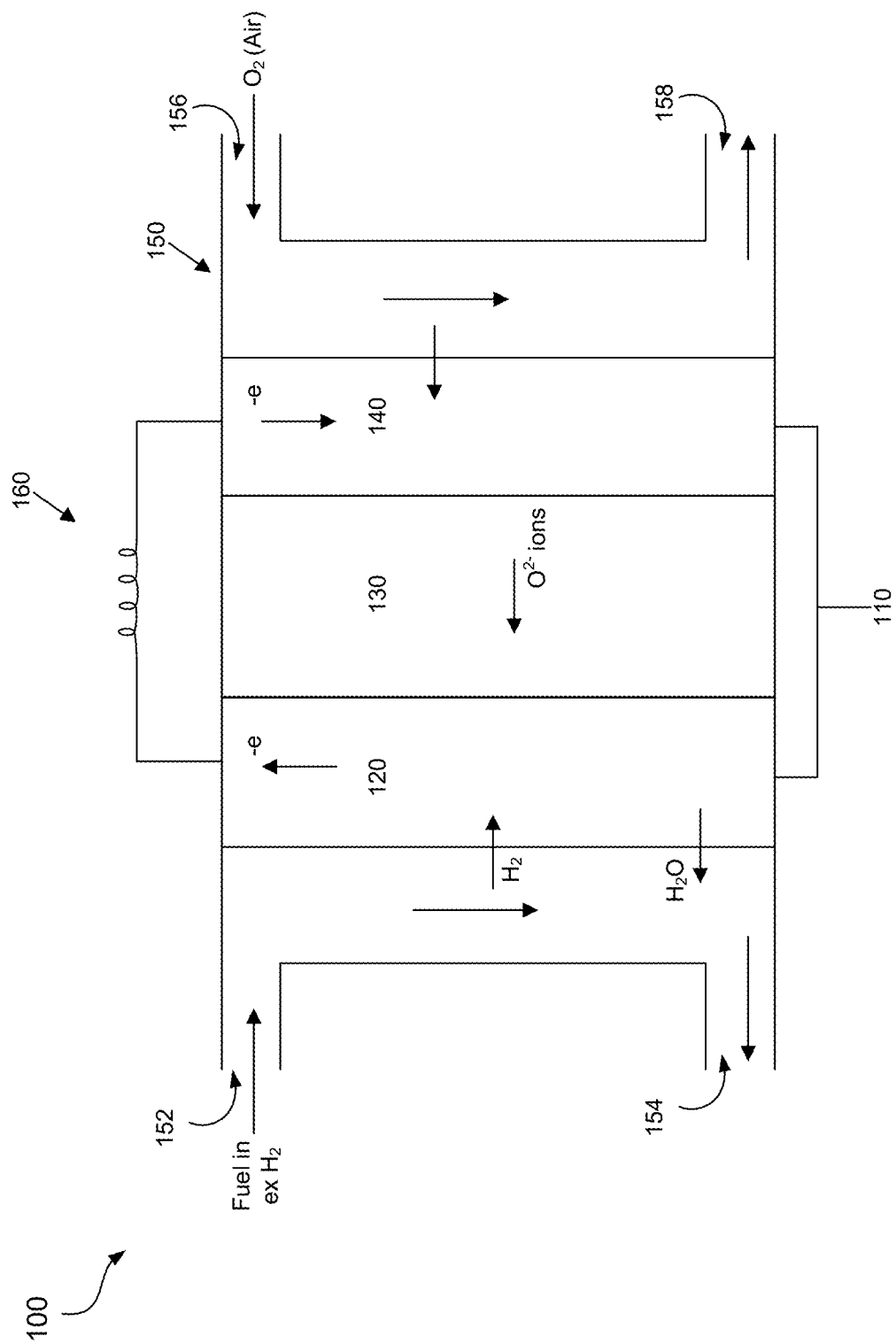
FIG. 1 shows a schematic of a fuel cell system according to one embodiment.

FIG. 1 shows a basic schematic of a solid oxide fuel cell system 100 according to one embodiment. System 100 includes a fuel cell 110 having an anode layer 120, an electrolyte layer 130, and a cathode layer 140. Anode layer 120, electrolyte layer 130, and cathode layer 140 are contained within a housing 150 that facilitates the flow of fuel (e.g. hydrogen) adjacent to anode layer 120 and the flow of air (containing $O_2$) adjacent to cathode layer 140. Housing 150 includes fuel inlet 152, fuel outlet 154, air inlet 156, and air outlet 158. An electric circuit 160 is attached to both the anode layer 120 and the cathode layer 140 for harvesting energy created by fuel cell 110.

The basic operation of fuel cell system 100 according to one embodiment will now be described with reference to FIG. 1. Air flows into system 100 through air inlet 156. As the air flows past cathode layer 140, oxygen atoms are rescued within cathode layer 140 to create oxygen ions ($O^{2-}$) which flow towards electrolyte layer 130. The oxygen ions travel through electrolyte layer 130 and into anode layer 120, and then react with hydrogen gas at anode layer 120. The reaction between the oxygen ions and the hydrogen gas at anode layer 120 creates $H_2O$ and electrons ($e^-$). These electrons flow from anode layer 120 into electronic circuit 160 and back into cathode layer 140. Electronic circuit 160 uses the flow of electrons to power a device (not show) and cathode layer 140 uses the electrons to reduce oxygen atoms and start the process all over again. The chemical reactions for the fuel cell system 100 can be expressed as follows:

Anode Reaction: $2H_2 + 2O^{2-} \rightarrow 2H_2O + 4e^-$

Cathode Reaction: $O_2 + 4e^- \rightarrow 2O^{2-}$

Overall Cell Reaction: $2H_2 + O_2 \rightarrow 2H_2O$.

Materials that can used for electrolyte layer 130 include, but are not limited to, yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), yttria stabilized bismuth oxide (YSB), strontium and magnesium doped lanthanum gallate (LSGM), and combinations thereof. The electrolyte layer in some embodiments may include also multiple dopants and stabilizers.

Materials that can be used for cathode layer 140 include, but are not limited to, composite materials having (1) a material selected from the group consisting of: lanthanum strontium cobalt iron oxide (LSCF), barium strontium cobalt iron oxide (BSCF), samarium strontium cobalt iron oxide (SSCF), lanthanum strontium manganate (LSM); and (2) a material selected from the group consisting of: yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), dysprosium tungsten stabilized bismuth oxide (DWSB), yttria stabilized bismuth oxide (YSB), strontium and magnesium doped lanthanum gallate (LSGM). In some embodiments, cathode layer 140 may be composed of a single material selected from the group consisting of: lanthanum strontium cobalt iron oxide (LSCF), barium strontium cobalt iron oxide (BSCF), samarium strontium cobalt iron oxide (SSCF), lanthanum strontium manganate (LSM); yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), dysprosium tungsten stabilized bismuth oxide (DWSB), yttria stabilized bismuth oxide (YSB), and strontium and magnesium doped lanthanum gallate (LSGM).

FIGS. 2A and 2B show exemplary fuel cells 200 and 250 according to some embodiments. As shown in FIG. 2A, fuel cell 200 includes a cathode layer 210, an anode layer 220, and an electrolyte bilayer 230. Electrolyte bilayer 230 includes a first electrolyte layer 234 and a second electrolyte layer 232. First and second electrolyte layers 234 and 232 may be composed of the same or similar materials as electrolyte layer 130.

As shown in FIG. 2B, fuel cell 250 includes a cathode layer 260, an anode layer 290, and an electrolyte layer 280. Fuel cell 250 also includes an electrical contact layer 270 disposed on anode layer 290. While FIG. 2B shows an electrical contact layer 270 disposed under anode layer 290, it is appreciated that an electrical contact layer may additionally or alternatively be disposed over cathode layer 260. Furthermore, it is appreciated that some embodiments may include both an electrolyte bilayer and one or more electrical contact layers.

Materials that can be used for electrical contact layer disposed over cathode layer 260 include, but are not limited to, $La_{0.65}Sr_{0.5}Co_2O_5$ (LSM), $La_{0.6}Sr_{0.4}Co_{0.8}Fe_{0.2}$ (LSCF), $La_{0.8}Sr_{0.2}Cu_{0.9}Fe_{0.1}O_{2.5}$ (LSCuF), $La_{0.7}Sr_{0.3}CoO_3$ (LSC), $Sm_{0.5}Sr_{0.5}CoO_3$ (SSC), $SmBa_{0.5}Sr_{0.5}Co_2O_5$ (SBSC), $GdSrCo_2O_5$ (GSC), $LaBaCo_2O_5$ (LBC), $YBaCo_2O_5$ (YBC), $Nd_{1.8}Ce_{0.2}CuO_4$ (NCC), $La_{0.8}Sr_{0.2}Co_{0.3}Mn_{0.1}Fe_{0.6}O_3$ (LSCFM), $La_{0.98}Ni_{0.6}Fe_{0.4}O_3$ (LNF), $La_{1.2}Sr_{0.8}NiO_4$ (LSN), $La_{0.7}Sr_{0.3}FeO_3$ (LSF), $Ia_2Ni_{0.6}Cu_{0.4}O_4$ (LNC), silver, and their composites. The above compounds are listed in their stoichiometric ratios, but as appreciated by one of ordinary skill in the art, the atomic ratios may vary slightly. Furthermore, while some of these compounds may require a high firing temperature, it is appreciated that modifiers may be used to lower the firing temperature of these materials for use in intermediate- and low-temperature solid-oxide fuel cells.

In some embodiments, the fuel cell anode layer may include an anode functional layer (not shown). An anode functional layer is a separate anode layer with finer particle sizes to increase specific surface area, thereby increasing the electrochemical reaction rate at the interface between anode layer and electrolyte layer. In some embodiments, the anode functional layer is less porous than the rest of the anode layer. This may be achieved by controlling particle distribution and/or particle/solvent/binder ratios in a green body that is sintered to form the anode layer. In some embodiments, the anode functional layer is made of the same material as the anode layer itself. In some embodiments, the anode layer is made of a material that is different from the anode layer itself, such as Ni-GDC, Ni-perovskite, or with similar materials where Ni in replaced with a different metal.

Some embodiments are directed towards new anode materials for a SOFC anode layer, such as anode layer 120, comprising various compositions of vanadium-doped strontium titanate (SVT), and various compositions of vanadium- and sodium-doped strontium niobate (SNNV). The inventors have found that these materials are compatible with intermediate- and low-temperature SOFCs and provide high conductivity, reduction-oxidation stability, and compatibility with hydrocarbon and sulfur-containing fuels. Furthermore, these materials avoid drawbacks associated with traditional Ni-based oxide anode materials.

Ni-based materials have undesirability high thermal expansion coefficients that can result in cracking due to thermal cycling. Additionally, the thermal expansion coefficients for Ni-based materials are not similar to traditional solid oxide electrolyte materials, which leads to cracking and defects at the interface between the anode and the electrolyte. Ni-based anode materials are also highly susceptible to carbonation and have a high affinity to sulfur, both of which diminish the conductivity of the material and the operating efficiency of an SOFC fabricated using these materials.

The inventors have discovered that SVT and SNNV materials have high electronic conductivity when reduced at low temperatures. Being able to reduce the anode layer at low temperatures reduces damage to other layers within the fuel cell that may be sensitive to temperature. Such temperature sensitive layers may include the electrolyte layer and/or the cathode layer. According to some embodiments, SVT and SNNV anode materials have high conductivity when reduced at a temperature that is similar to the operating temperature of the SOFC. If a material can be reduced at temperatures similar to the operating temperature of the SOFC, the anode layer can be reduced in situ, meaning that a separate reducing operation during the fabrication of the SOFC is unnecessary. Preferably, the anode material has a high conductivity when reduced at a temperature of less than 850° C. More preferably, the anode material has a high conductivity when reduced at a temperature of less than 650° C. Preferably, the crystal structure of the anode layer is perovskite. Preferably, the anode layer includes only oxide materials.

In some embodiments, the anode layer including vanadium doped strontium titanate has a conductivity of at least 10 S*cm$^{-1}$ when reduced at a temperature less than 850° C. Preferably, the anode layer including vanadium doped strontium titanate reduced at a temperature between 300-850° C. has a conductivity between 10-100 S*cm$^{-1}$ when the conductivity is measured at 500° C. In some embodiments, the anode layer including vanadium doped strontium titanate has a conductivity of at least 10 S*cm$^{-1}$ when reduced at a temperature less than 650° C. Preferably, the anode layer including vanadium doped strontium titanate reduced at a temperature between 300-650° C. has a conductivity between 10-100 S*cm$^{-1}$ when the conductivity is measured at 500° C. In some embodiments, the anode layer including vanadium doped strontium titanate has a conductivity of at least 30 S*cm$^{-1}$ when reduced at a temperature less than 850° C. Preferably, the anode layer including vanadium doped strontium titanate reduced at a temperature between 300-850° C. has a conductivity between 30-100 S*cm$^{-1}$ when the conductivity is measured at 500° C. In some embodiments, the anode layer including vanadium doped strontium titanate has a conductivity of at least 30 S*cm$^{-1}$ when reduced at a temperature less than 650° C. Preferably, the anode layer including vanadium doped strontium titanate reduced at a temperature between 300-650° C. has a conductivity between 30-100 S*cm$^{-1}$ when the conductivity is measured at 500° C.

In some embodiments, the anode layer including vanadium- and sodium-doped strontium niobate has a conductivity of at least 100 S*cm$^{-1}$ when reduced at a temperature of less than 650° C. Preferably, the anode layer including vanadium- and sodium-doped strontium niobate reduced at a temperature between 300-650° C. has a conductivity between 100-300 S*cm$^{-1}$ when the conductivity is measured at 650° C. In some embodiments, the anode layer including vanadium- and sodium-doped strontium niobate has a conductivity of at least 250 S*cm$^{-1}$ when reduced at a temperature of less than 650° C. Preferably, the anode layer including vanadium- and sodium-doped strontium niobate reduced at a temperature between 300-650° C. has a conductivity between 250-300 S*cm$^{-1}$ when the conductivity is measured at 650° C.

Some embodiments also include structures for blocking the diffusion of mobile dopant materials, e.g. vanadium or sodium, out of SVT or SNNV, while maintaining the functionality of the SVT and SNNV as part of the SOFC. The diffusion of mobile dopant materials into an electrolyte layer can decrease the conductivity of the electrolyte layer and reduce the efficiency of the SOFC. Vanadium or sodium diffusion diffusions can also decrease the mechanical strength of the electrolyte layer and result in the formation of a phase or phases that cause high interfacial resistance between the anode layer and the electrolyte.

Vanadium-Doped Strontium Titanate (SVT)

$Sr_xV_yTi_{1-y}O_{3\pm\delta}$ (1.0≥x≥0.80 and 0.10≤y≤0.40), was explored as a possible conductive ceramic for intermediate- and low-temperature SOFC anodes with anti-coking and reduction-oxidation stability.

The variable δ in the above compositions of SVT represents an oxygen deficiency and/or surplus in the composition. The value of δ is dependent on temperature and the oxidation state of vanadium and titanium in the composition of SVT. Additionally, the value of δ may vary depending on the partial pressure of oxygen in the atmosphere and within the anode itself. In some embodiments, δ may be between 0 and 1.5.

Test samples of $Sr_{0.875}V_{0.25}Ti_{0.75}O_3$ (SVT25) and $Sr_{0.85}V_{0.3}Ti_{0.7}O_3$ (SVT30) were synthesized by conventional solid state reactions. Stoichiometric amounts of $SrCO_3$ (Sigma Aldrich 99.9%), $TiO_2$ (Inframat Advanced Materials, Rutile, Nano Powder, 99%) and $V_2O_5$ (Alfa Aesar, 99.6% min) were mixed and milled in ethanol for 24 h. The precursors were then dried in a 100° C. oven. The powder was calcined at >950° C. then ball milled again in ethanol and dried. Pellets were pressed at 100 MPa and sintered at 1300° C. for 4 h.

To evaluate the phase of the material and the phase purity, x-ray diffraction was performed using a Bruker D8 Advance diffractometer with CuKα radiation. Electronic conductivity was measured using a four probe DC method. Sintered pellets were cut into bars and reduced in 10% $H_2$ balanced with N2 at 650° C. for one day. A Keithley 2400 SourceMeter® was used as a current source and coupled with a Keithley 2000 Multimeter for voltage measurement.

Figure 3A:
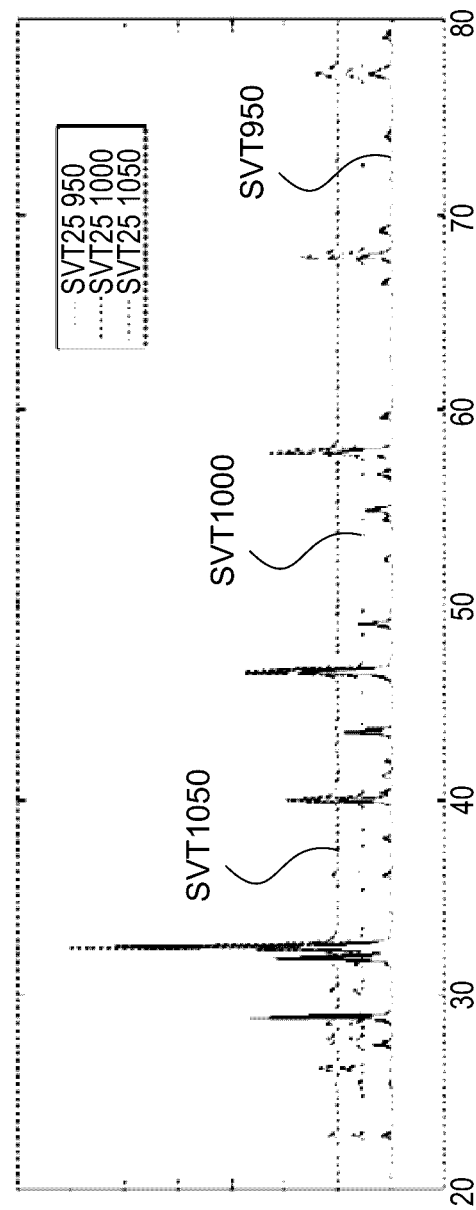
FIGS. 3A and 3B show x-ray patterns of SVT calcinated at different temperatures according to some embodiments.
Figure 3B:
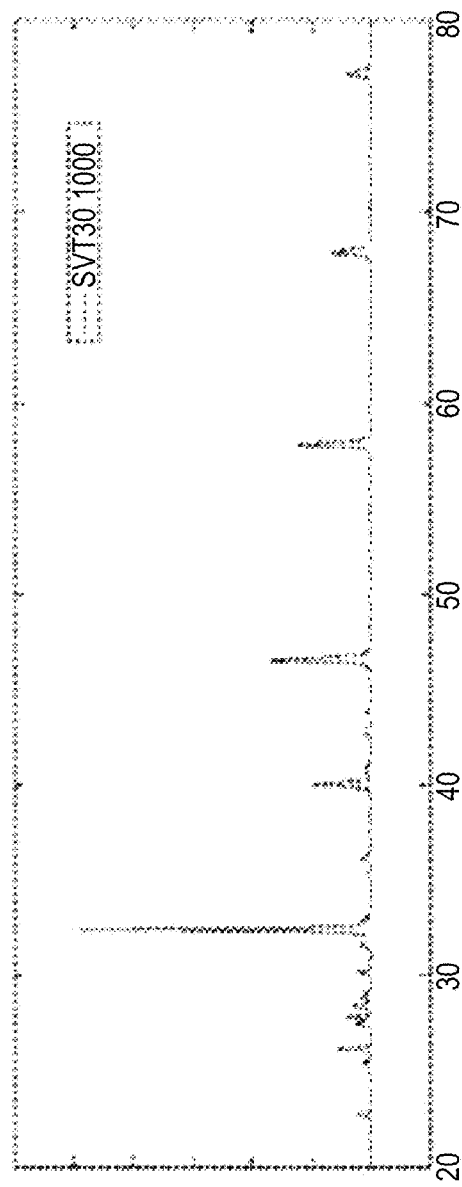

As shown in FIG. 3A, the best calcination temperature for SVT25, in terms of phase purity, is around 1000° C. At temperatures of 1000° C. and above (e.g. 1050° C.) the X-ray patterns show that SVT25 has a cubic single perovskite phase. Similarly, as shown in FIG. 3B, SVT30 has a cubic single perovskite phase after calcination at 1000° C. for 5 h.

Figure 4:
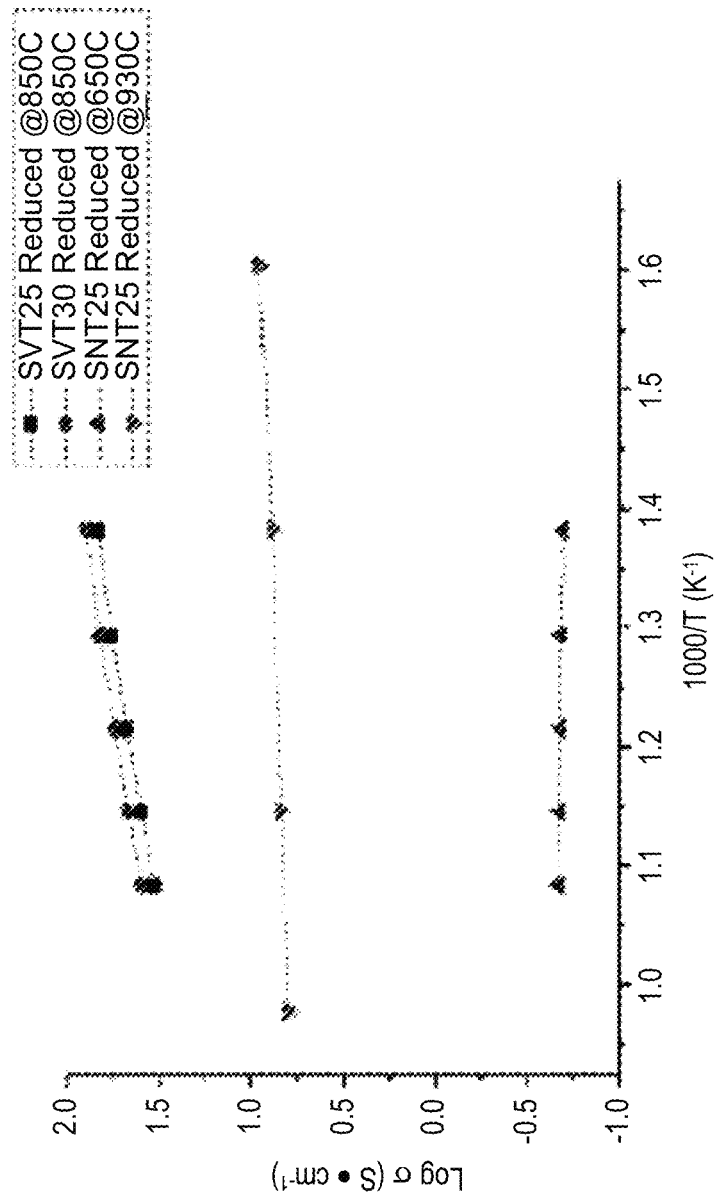
FIG. 4 shows a graph of a comparison between the conductivity of SVT and SNT.

The conductivities of SVT25, SVT30 and SN125 were measured and compared. The results are shown in FIG. 4. All of the SVT and SNT samples were reduced in 10% $H_2$ for one day at 850° C. and compared with SNT25 which was reduced at 930° C. and 650° C.

For SNT25, the conductivity greatly depends on the reduction temperature. When it is reduced at 930° C., it has a metallic conductivity of about 6.5 S*cm$^{-1}$ across a range of temperatures. However, if the reduction temperature is lowered to 650° C., the resistance is very large and it no longer shows metallic conduction. In contrast, SVT25 and SVT30 have a conductivity of about one magnitude higher than SNT25. Additionally, FIG. 4 indicates that the conductivity of SVT increases when the dopant amount is increased from 25 at % to 30 at %.

Figure 5:
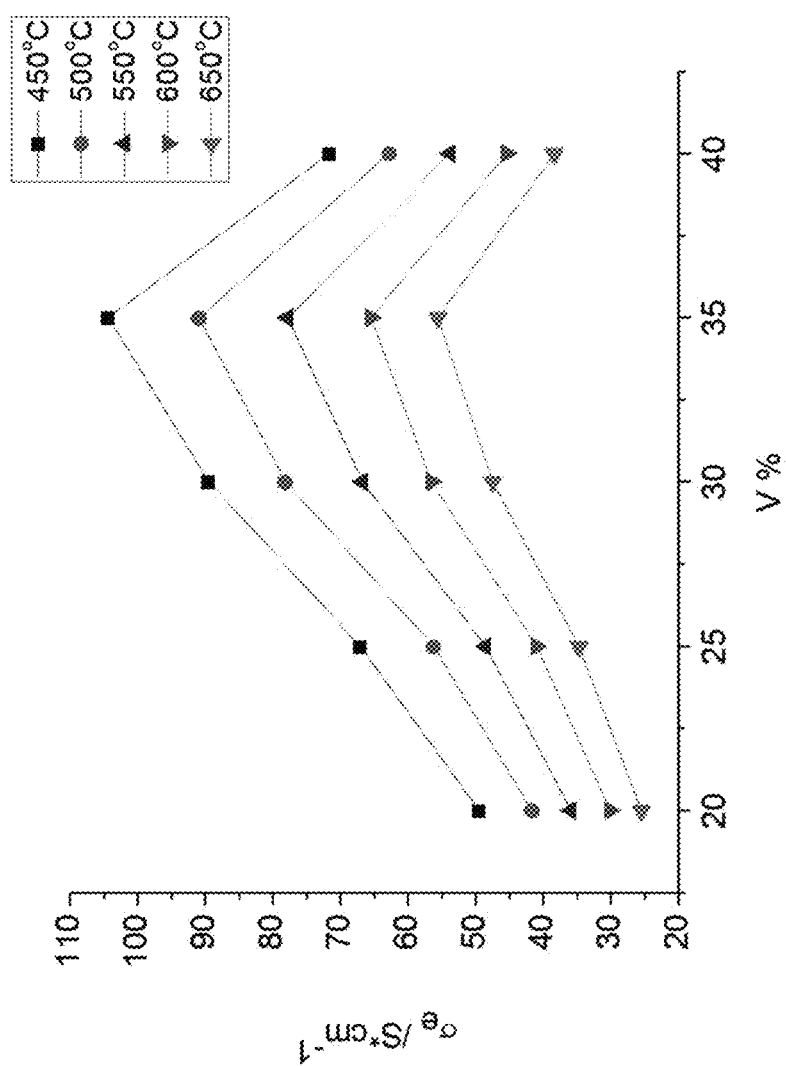
FIG. 5 shows a graph of the conductivity of SVT with different vanadium doping levels in 10% $H_2$.

FIG. 5 shows the conductivity trend of SVT with different vanadium doping levels in 10% $H_2$. In FIG. 5, vanadium dopant ranges from 10 at % to 40 at % at the titanium site. Various samples were tested at five different temperatures, 450° C., 500° C., 550° C., 600° C., and 650° C. As shown in FIG. 5, with increasing vanadium level, the conductivity increases and reaches the maximum at 35%. After that, the conductivity decreases. All the samples tested at the different temperatures (450° C. to 650° C.) follow this trend.

As such, SVT is a promising SOFC anode material. FIG. 4 shows that it has higher conductivity than SNT when reduced at a low temperature, i.e. 850° C. Additionally, in order to achieve this performance, no extra steps are required such as sintering in $H_2$ or reducing at high temperature. Furthermore, the above experiments indicate that SVT is relatively easy to produce.

Vanadium-doped strontium titanate (SVT) is formed by doping strontium titanate (SrTiO$_3$) with vanadium and has the chemical formula $Sr_xV_yTi_{1-y}O_{3\pm\delta}$. Preferably, the value of x is: $1.0 \geq x \geq 0.80$. Preferably, the value of y is: $0.10 \leq y \leq 0.40$, meaning that SrTiO$_3$ is doped with 10 to 40 at % vanadium at the titanium site. More preferably, the value of y is: $0.25 \leq y \leq 0.40$, meaning that SrTiO$_3$ is doped with 25 to 40 at % vanadium at the titanium site. Most preferably, the value of y is: $0.30 \leq y \leq 0.40$, meaning that SrTiO$_3$ is doped with 30 to 40 at % vanadium at the titanium site.

Vanadium- and Sodium-Doped Strontium Niobate (SNNV) $Sr_{0.2}Na_{0.8}Nb_{1-x}V_xO_{3\pm\delta}$ ($0.1 \leq x \leq 0.3$), was explored as a possible conductive ceramic for intermediate- and low-temperature SOFC anodes with anti-coking and reduction-oxidation stability.

Figure 6:
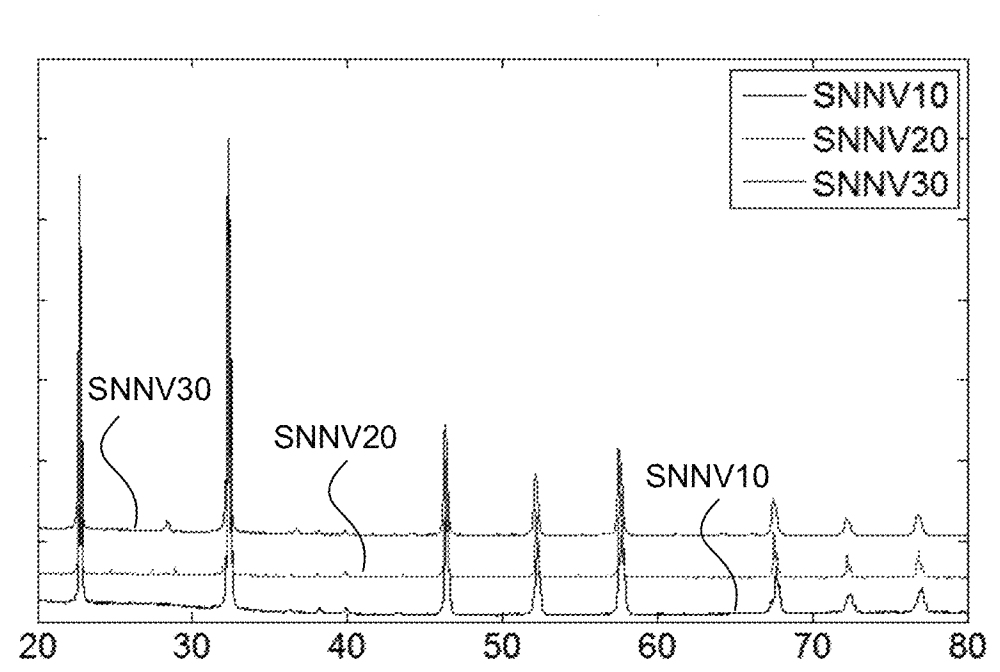

Various compositions where synthesized and tested including, $Sr_{0.2}Na_{0.8}Nb_{0.9}V_{0.1}O_{3\pm\delta}$ (SNNV10), $Sr_{0.2}Na_{0.8}Nb_{0.8}V_{0.2}O_{3\pm\delta}$ (SNNV20), and $Sr_{0.2}Na_{0.8}Nb_{0.7}V_{0.3}O_{3\pm\delta}$ (SNNV30). SNNV10, SNNV20 and SNNV30 were calcined at 900° C. for 4 h and then sintered at 1300° C. for 4 h. As shown in FIG. 6, all of the samples show a single cubic perovskite phase when analyzed using x-ray diffraction.

The variable δ in the above compositions of SNNV represents an oxygen deficiency and/or surplus occurring the composition. The value of δ is dependent on temperature and the oxidation state of vanadium and titanium in the composition of SNNV. Additionally, the value of δ may vary depending on the partial pressure of oxygen in the atmosphere and within the anode itself. In some embodiments, δ may be between 0 and 1.5.

Figure 7:
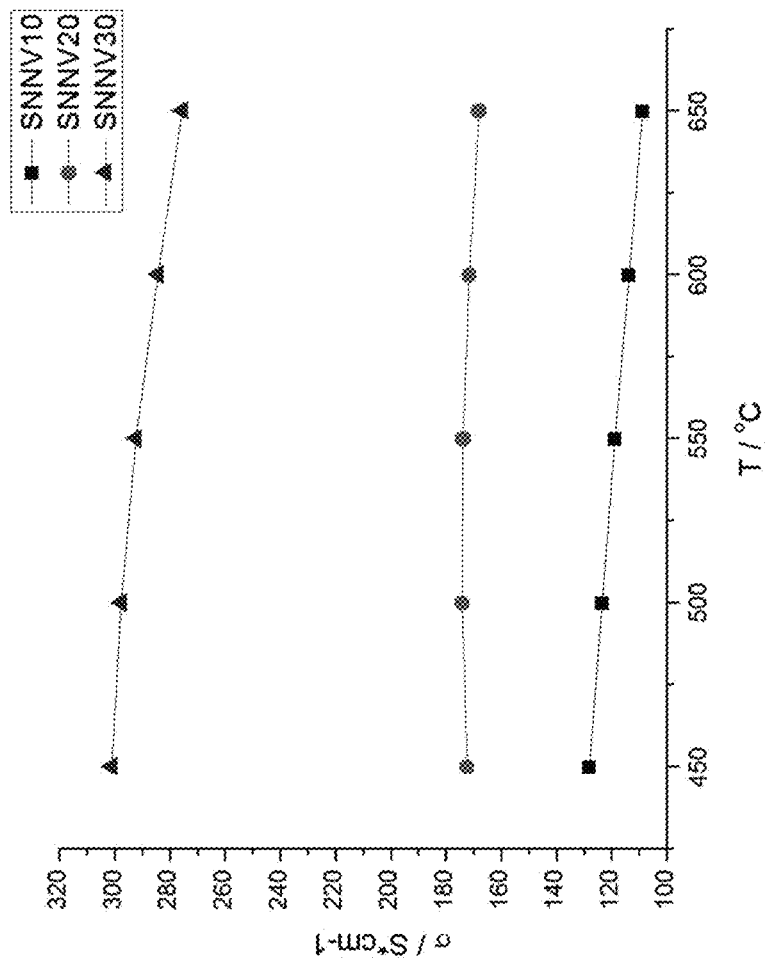
FIG. 7 shows a graph comparing the conductivity of SNNV with different vanadium doping levels reduced in 10% $H_2$ for 24 hours according to some embodiments.
Figure 8:
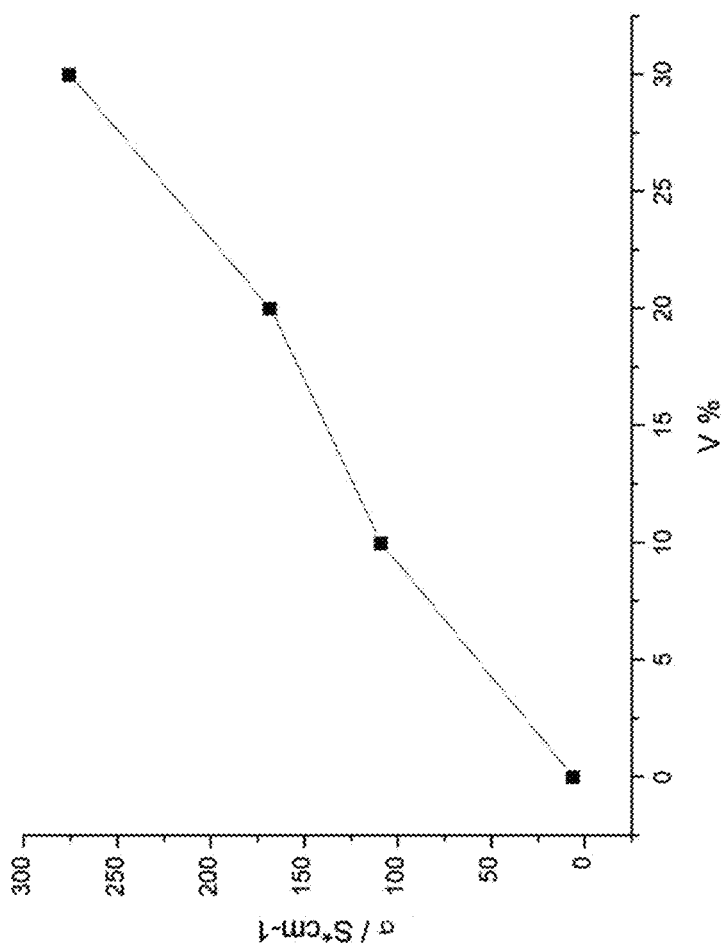
FIG. 8 shows a graph of the conductivity of SNNV at 650° C. versus vanadium doping level.

FIG. 7 shows a graph depicting the conductivity of SNNV10, SNNV20 and SNNV30 measured at various temperatures between 450° C. and 650° C. All samples were reduced in 10% $H_2$ for 24 hours at 650° C. FIG. 7 shows that the SNNV anode materials have metallic conductivities after reduction in 10% $H_2$ for 24 hours and shows that, with increasing vanadium doping level, the conductivity increases. FIG. 8 also illustrates that increasing vanadium doping level increases the conductivity of SNNV. FIG. 8 shows a graph depicting the conductivity trend of sodium-doped strontium niobate (SNNO) with 0% vanadium dopant and SNNV having 10 at %, 20 at %, and 30 at % vanadium at the titanium site measured at 650° C. Each sample of SNNV was reduced at 650° C. As shown in FIG. 8, increasing the vanadium level improves the electrical performance, and the conductivity of SNNV appears to relate linearly with the vanadium doping level.

While conductivity appears to relate linearly with vanadium doping level, vanadium at % about or above 30 can result in an undesirable phase change that causes stability issues. Additionally, increasing the vanadium at % may lower the melting temperature of a vanadium-doped material. If there is too much vanadium in the material, the melting temperature may be lowered too much to process the anode material with the electrolyte material(s). Also, thermal stability may be a problem. Increasing vanadium doping can result in the formation of a secondary glassy phase in the material that can evaporate during fabrication. Increasing vanadium doping causes an increase in the amount of this glassy phase which can result in more material evaporating during fabrication.

Preferably, the vanadium- and sodium-doped strontium niobate is doped with 10 to 30 at % vanadium at the niobium site. More preferably, the vanadium- and sodium-doped strontium niobate is doped with 20 to 30 at % vanadium at the niobium site.

Figure 9:
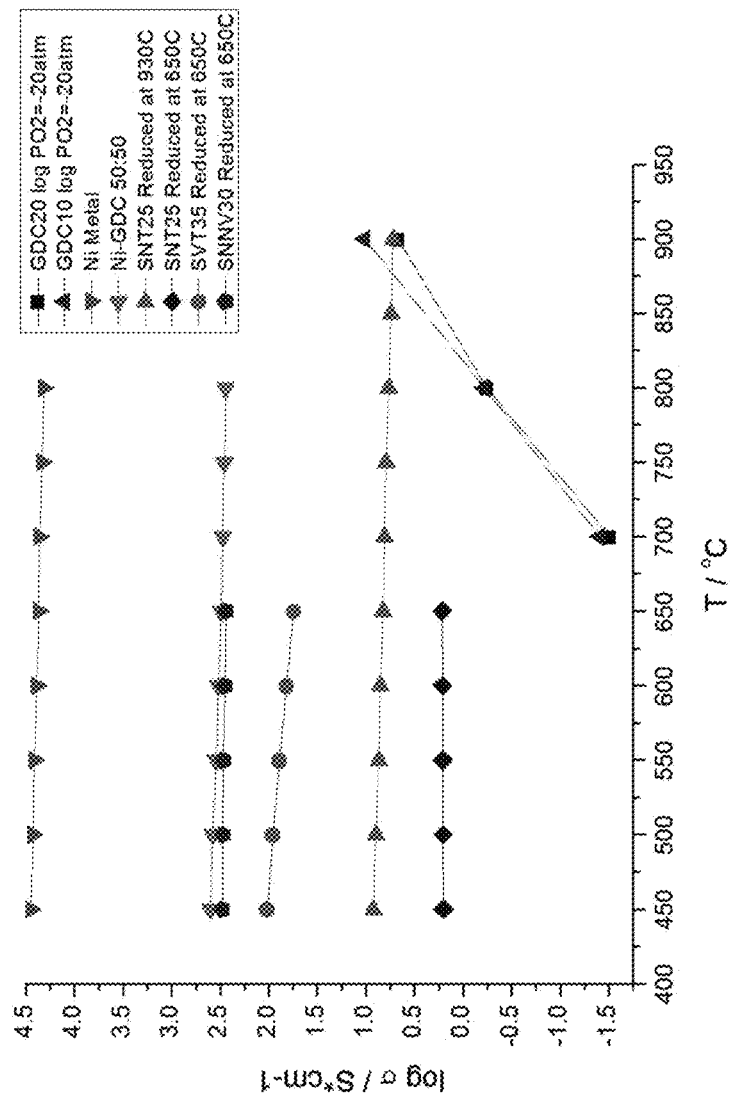
FIG. 9 shows a graph comparing the conductivity of various anode materials.

FIG. 9 shows a comparison of the conductivity of various anode materials across a range of temperatures between 450° C. and 900° C. The various materials compared included GDC20 log PO$_2$=−20 atm, GDC10 log PO$_2$=−20 atm, Ni Metal, Ni-GDC 50:50, SNT25 reduced at 930° C., SNT25 reduced at 650° C., SVT 35 reduced at 650° C., and SNNV reduced at 650° C. Compared to other ceramic anode materials, SNNV30 has the highest conductivity. SNNV30's conductivity is over one magnitude higher than high-temperature-reduced SNT25 (SNT25 reduced at 930° C.) and about two magnitudes higher than low-temperature-reduced SNT25 (SNT25 reduced at 650° C.). SNNV30 also has a higher conductivity than SVT35. Furthermore, FIG. 9 shows that SNNV 30 reduced at 650° C. has a conductivity that is approximately equal to traditional SOFC anode material Ni-GDC.

Figure 10:
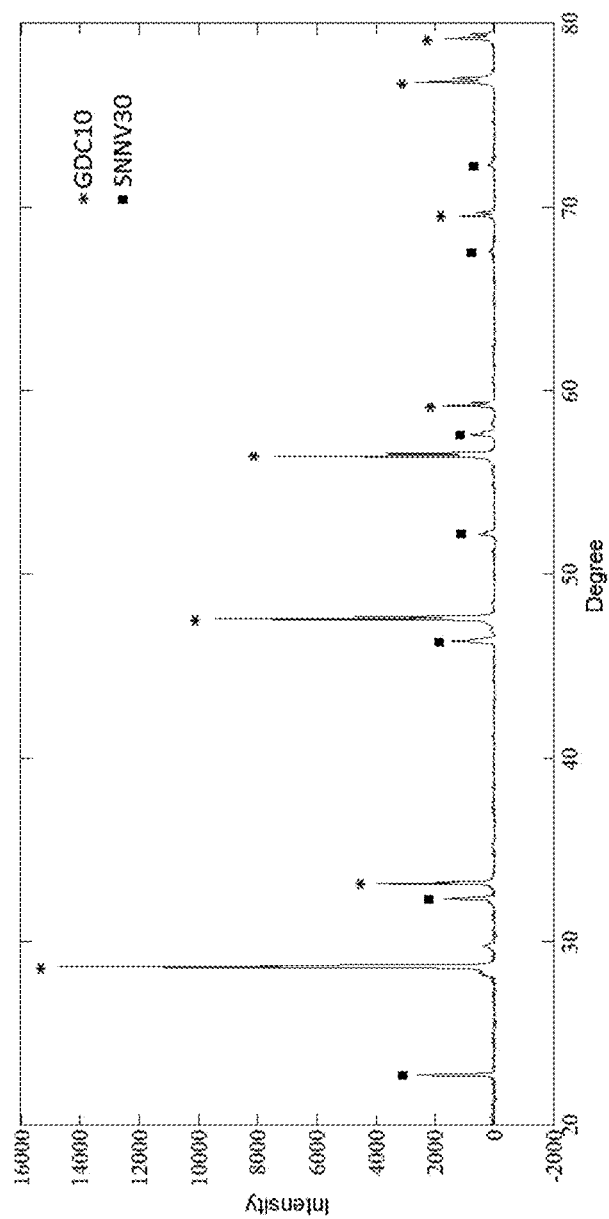
FIG. 10 shows an x-ray pattern of SNNV30 and GDC10 composite according to one embodiment.

A composite of 50% GDC10 and 50% SNNV30 (volume ratio) was mixed and fired at 1300° C. for 4 hours. The x-ray pattern in FIG. 10 reveals that the composite has separate phases. No new phase forms.

Figure 11:
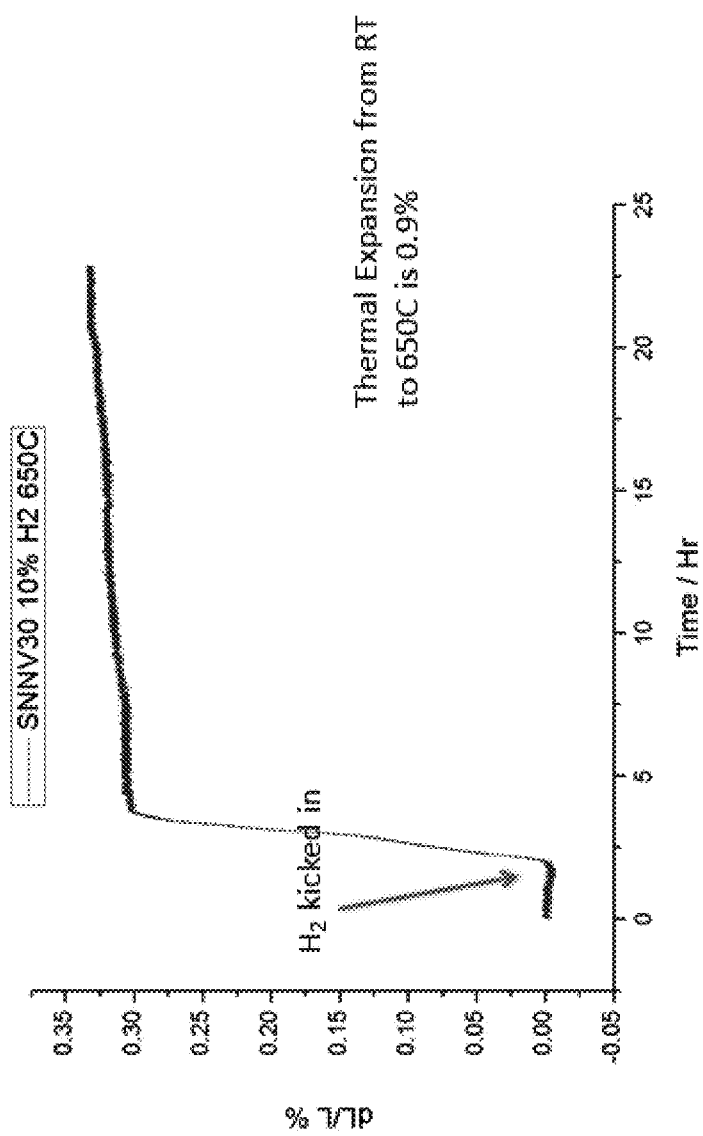
FIG. 11 shows a graph of the linear expansion of SNNV30 during reduction.

The linear expansion of SNNV30 during a reduction in 10% $H_2$ at 650° C. is shown in FIG. 11. It can be seen that SNNV30 quickly reduces and expands during the first 3 hours and then reaches a pseudo plateau due to slow kinetics. SNNV30 can be considered to be almost fully reduced at this time. FIG. 11 shows that the linear expansion of SNNV30 is about 0.3%. This is due to cation size increase and oxygen vacancy generation during heating. The thermal expansion from room temperature to 650° C. is 0.9% which is much larger than the linear expansion due to reduction of the SNNV30. As such, the thermal expansion coefficient is a relatively more important factor when determining the behavior of SNNV30 during SOFC operation.

Figure 12:
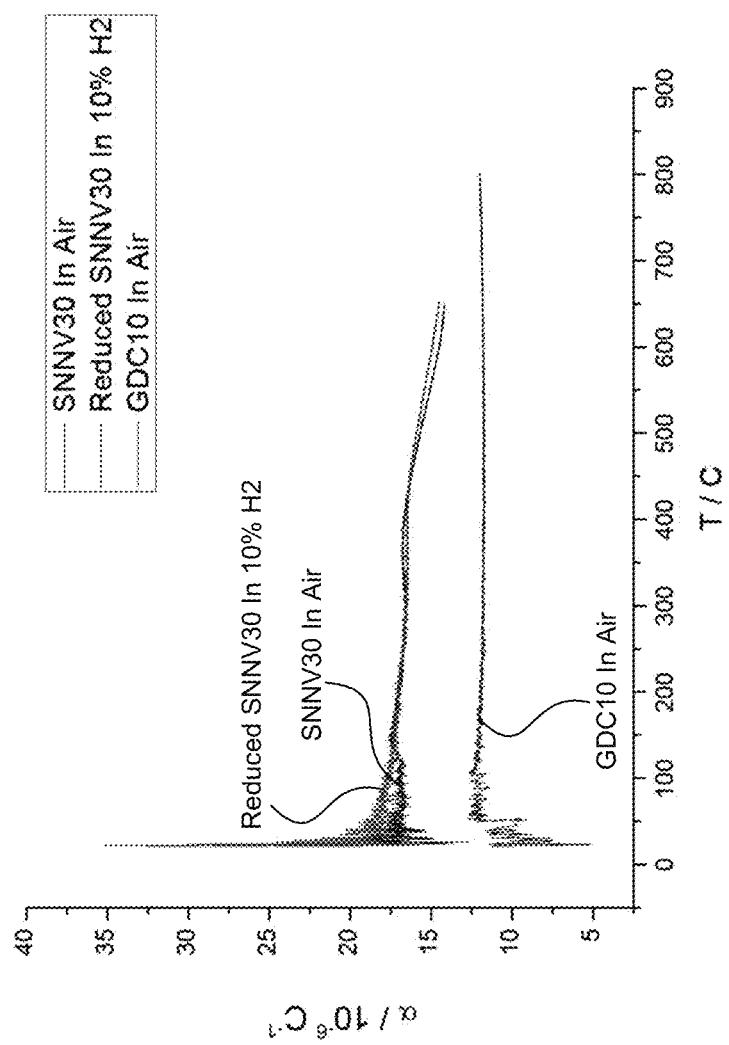
FIG. 12 shows a graph of the thermal expansion coefficients of SNNV30 and GDC10.

FIG. 12 shows the thermal expansion coefficient of SNNV 30 and GDC10. The thermal expansion coefficient (TEC) of GDC is around 1.2e-5 which is quite similar to the reference value. It is relatively constant from 100° C. to 800° C. SNNV30 has a TEC of about 1.4e-5, which is a bit larger than GDC10. However, FIG. 12 shows that the difference between the TEC for reduced and unreduced SNNV30 is very small. This small difference indicates that SNNV30 is mechanically stable during redox cycling.

Vanadium- and sodium-doped strontium niobate (SNNV) is formed by doping sodium-doped strontium niobate (SNNO) with vanadium and has the chemical formula $Sr_{0.2}Na_{0.8}Nb_{1-x}V_xO_{3\pm\delta}$. Preferably, the value of x is: $0.10 \leq x \leq 0.30$, meaning that SNNO is doped with 10 to 30 at % vanadium at the titanium site. More preferably, the value of x is: $0.20 \leq x \leq 0.30$, meaning that SNNO is doped with 20 to 30 at % vanadium at the titanium site.

Fabrication of Solid Oxide Fuel Cells Using SVT and SNNV Anodes

Solid oxide fuel cells based on SNNV and SVT were fabricated and tested. In some embodiments, the electronic conducting vanadium-containing anode material was combined with pyrolyzable pore formers to facilitate adequate fuel diffusion through the ceramic anode after firing. An oxygen ion conducting electrolyte was deposited on the surface of a supporting porous body containing SVT or SNNV and then sintered. Due to the constrained sintering of a thin layer of electrolyte on the bulk SVT or SNNV anode layer, the sintering temperature of the electrolyte layer is decreased to 1200-1400° C. when using a $Ce_{0.9}Gd_{0.9}O_{1.95-\delta}$ (GDC) electrolyte, as opposed to $\geq 1450°$ C. required for conventional SOFCs using GDC electrolytes. This effect lowers the manufacturing costs of the devices. A cathode including ionic and electronic conductors or mixed conductors such as $La_{0.6}Sr_{0.4}Co_{0.8}Fe_{0.2}O_3$ (LSCF) was sintered on the electrolyte surface after electrolyte firing to complete the SOFC. Cross sectional scanning electron microscope (SEM) images of complete solid electrolyte fuel cells (SOCFs) according to two embodiments are shown in FIGS. 13A and 13B.

Figure 13A:
FIG. 13A shows a cross sectional scanning electron microscope (SEM) image of a complete fuel cell according to one embodiment.
Figure 13B:
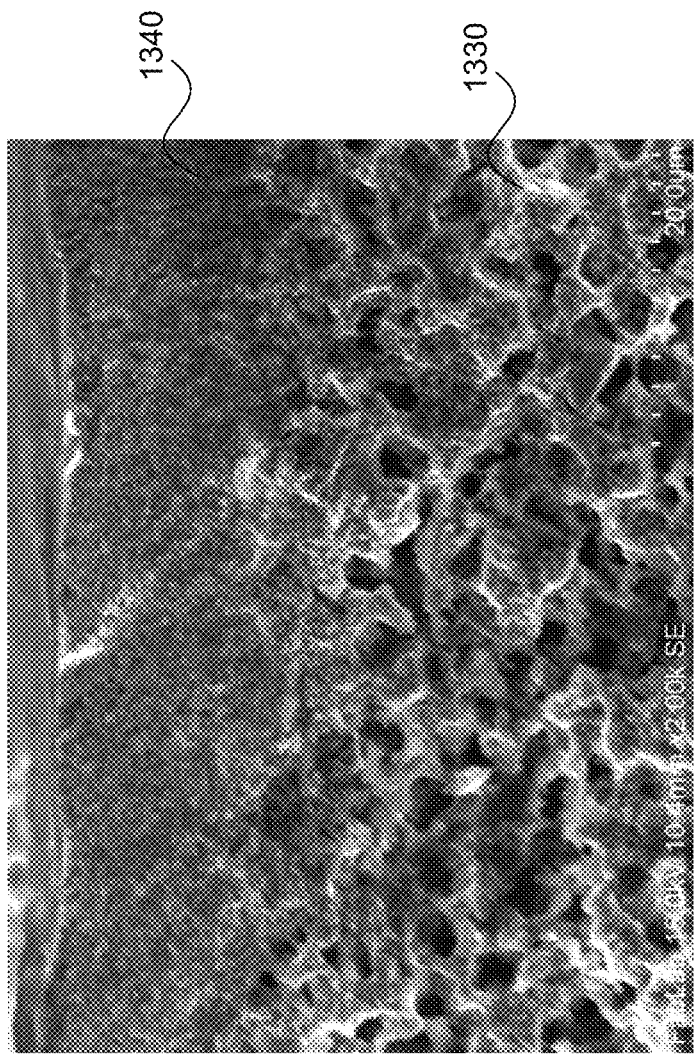
FIG. 13B shows a cross sectional SEM image of a complete fuel cell according to one embodiment.
Figure 14:
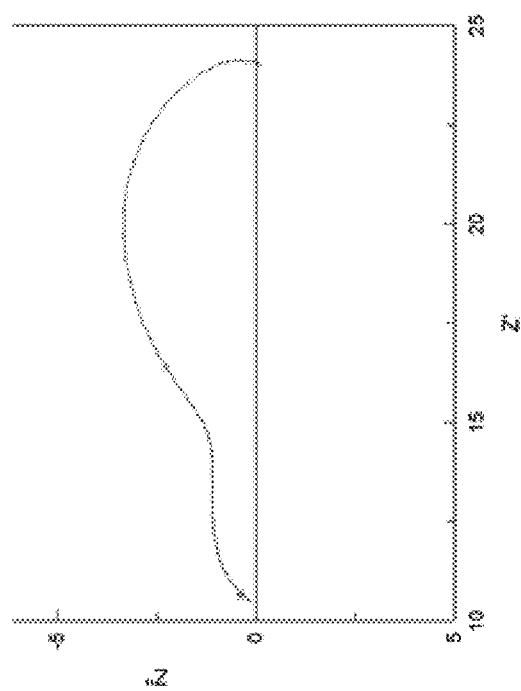
FIG. 14 shows a Nyquist plot of the complete fuel cell shown in FIG. 13A.

FIG. 13A shows a porous SVT anode layer 1300 supporting a GDC electrolyte layer 1310 and an LSCF-GDC cathode layer 1320 according to one embodiment. FIG. 13B shows a porous SNNV-GDC anode layer 1330 supporting a GDC electrolyte layer 1340. The performance of the SOFCs was evaluated by electrochemical impedance spectroscopy (EIS). The Nyquist plot, displayed in FIG. 14, shows the impedance of the SOFC shown in FIG. 13A. FIG. 14 indicates that the Ohmic polarization is low due to the high electronic conductivity, but the total polarization is increased at low frequency. In some embodiments, this can easily be alleviated using an additional catalyst material.

Figure 15A:
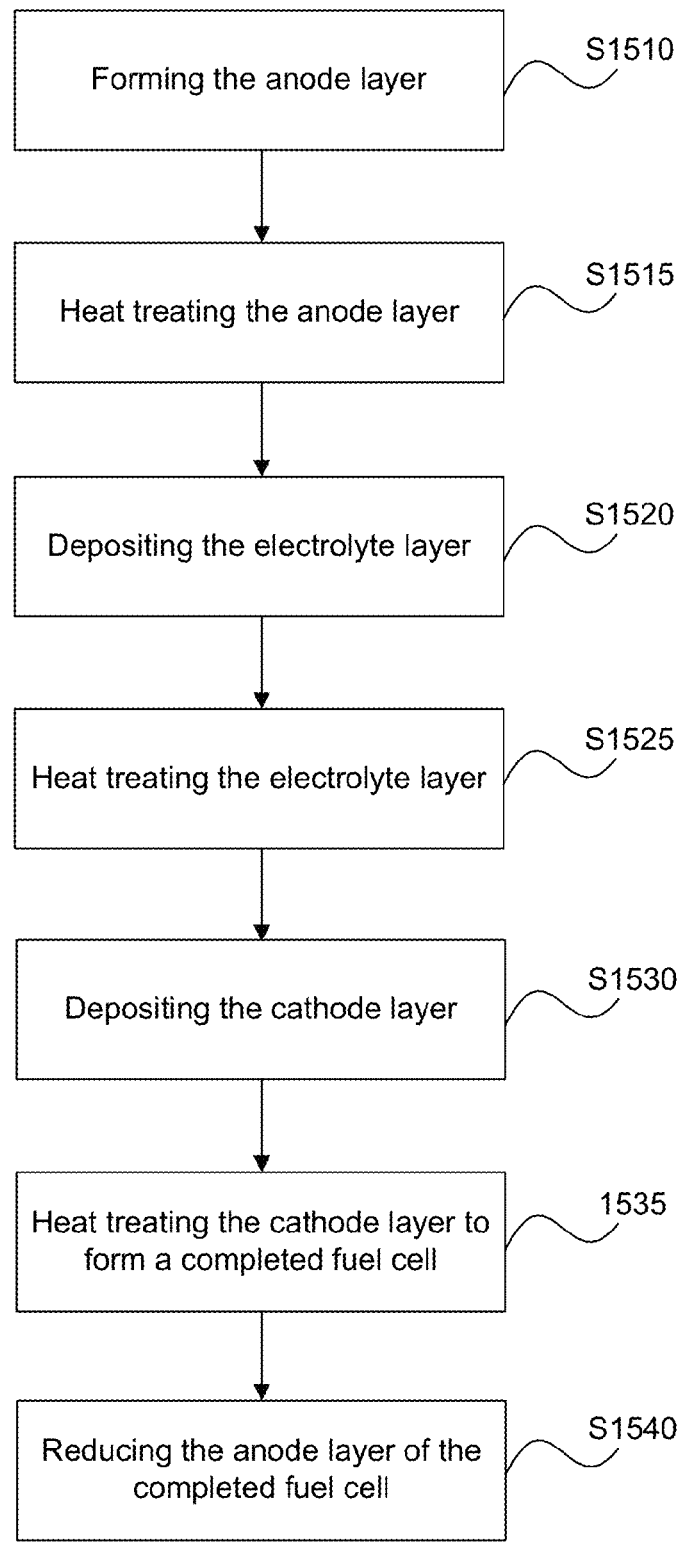
FIG. 15A shows a flowchart illustrating a method of making a low temperature solid-oxide fuel cell according to one embodiment.
Figure 15B:
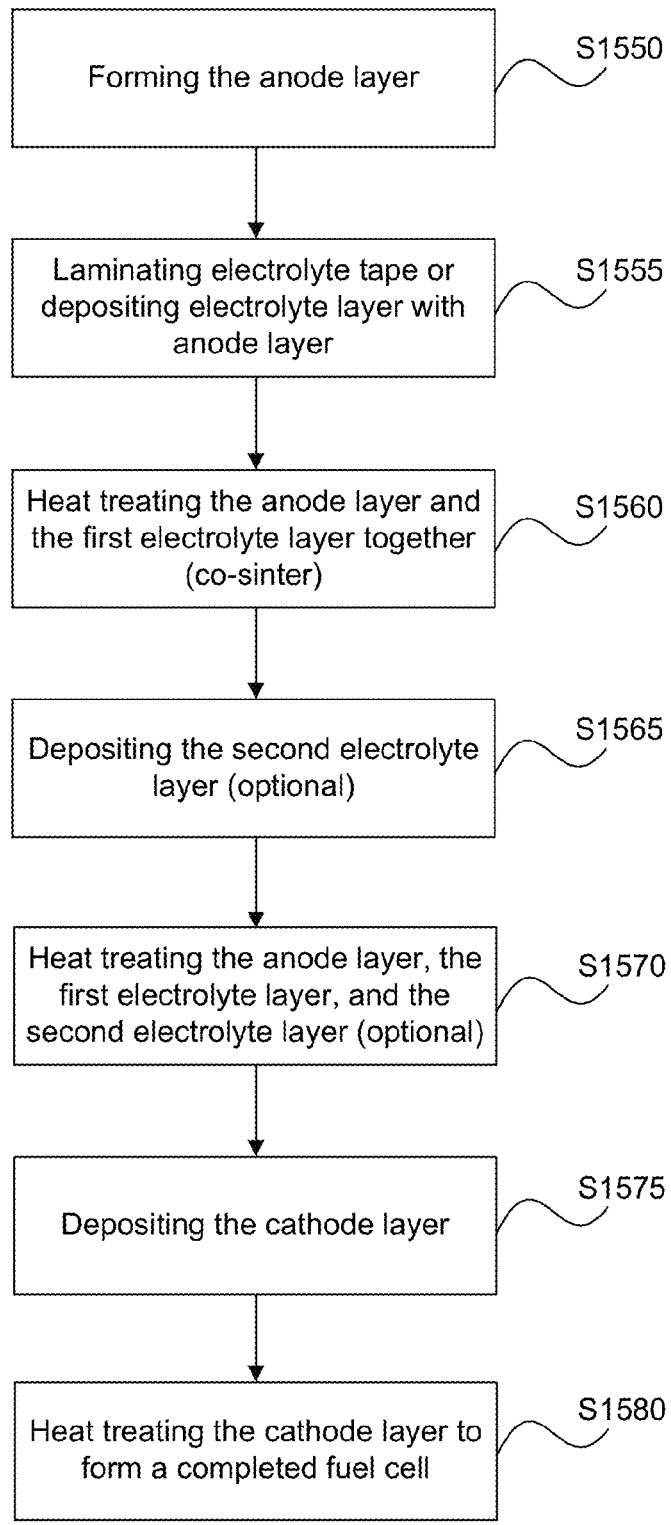
FIG. 15B shows a flowchart illustrating a method of making a low temperature solid-oxide fuel cell according to one embodiment.

Various layers may be sintered separately or co-sintered in various permutations. FIGS. 15A and 15B show two non-limiting examples. An exemplary method 1500 of fabricating an intermediate- or low-temperature solid oxide fuel cell 110 according to one embodiment will now be described in reference to FIG. 15A. In the method of FIG. 15A, anode layer 120 is heat treated prior to the introduction of electrolyte layer 130. First, in steps S1510 and S1515, anode layer 120 is fabricated. In S1510, anode layer 120 is formed, for example, by preparing a green body having the desired oxide composition. After anode layer 120 is formed, it is subjected to a heat treatment in S1515, the heat treatment including at least a sintering step. The sintering in S1515 may fully sinter anode layer 120 or may partially sinter (pre-sinter) anode layer 120. In some embodiments, the anode layer is fully sintered at a temperature between 900° C.-1500° C.

Pre-sintering is used in fabrication embodiments where the anode layer is fully sintered after the electrolyte layer 130 is deposited on it, i.e. anode layer 120 and electrolyte layer 130 are co-sintered. In such embodiments, pre-sintering serves to partially sinter anode layer 120, thereby reducing the amount of shrinkage that occurs when anode layer 120 is co-sintered with electrolyte layer 130. This helps prevent the formation of defects or cracks at the interface between anode layer 120 and electrolyte layer 130 due to shrinkage mismatch. In some embodiments, anode layer 120 is pre-sintered at a temperature between 900° C.-1000° C. and co-sintered with electrolyte layer 130 at a temperature between 900° C.-1500° C. Preferably, anode layer 120 and electrolyte layer 130 are co-sintered at a temperature between 1200° C.-1300° C.

Once anode layer 120 is fully or partially sintered in S1515 and cooled, electrolyte layer 130 is fabricated on anode layer 120 in steps S1520 and S1525. In S1520, electrolyte layer 130 is deposited on anode layer 120 by, for example, mixing and coating a slurry on anode layer 120, although any suitable method may be used. After electrolyte layer 130 is deposited, it is heat treated in S1525, the heat treatment including at least a sintering step. In some embodiments, electrolyte layer 130 is sintered at a temperature between 900° C.-1500° C. Preferably, electrolyte layer 130 is sintered at a temperature between 1200° C.-1300° C.

After electrolyte layer 130 is sintered in S1525 and cooled, cathode layer 140 is fabricated on electrolyte layer 130 in steps S1530 and S1535. In S1530, cathode layer 140 is deposited on electrolyte layer 130 by, for example, mixing and coating a slurry on electrolyte layer 130. After cathode layer 140 is deposited, it is heat treated in S1535, the heat treatment including at least a sintering step. In some embodiments, cathode layer 140 is sintered at a temperature between 700° C.-1200° C. Preferably, cathode layer 140 layer is sintered at a temperature between 1000° C.-1100° C.

After the cathode layer is sintered and cooled, a complete fuel cell (i.e. anode layer, electrolyte layer, and cathode layer) is formed. While method 1500 describes fabricating three layers (anode, electrolyte, and cathode), it is appreciated that the completed fuel cell may include any number of additional layers. For example, but not limited thereto, the completed fuel cell may include a metallic contact layer and/or an electrolyte layer having two layers (i.e. electrolyte bilayer) as described above in reference to FIGS. 2A and 2B. Also, while method 1500 describes separate sintering steps for some layers, some or all of the layers may be sintered at the same time (co-sintered), see for example FIG. 15B.

In some embodiments, anode layer 120 of the completed fuel cell is subjected to a reduction process in S1540. The reduction process serves to remove oxygen from anode layer 120, thereby increasing its conductivity and optimizing the efficiency of the completed fuel cell during operation. Preferably, anode layer 120 is reduced at a temperature that is no higher than the operating temperature of the fuel cell. Preferably, anode layer 120 of the completed fuel cell is reduced at a temperature between 300° C. and 850° C. More preferably, anode layer 120 of the completed fuel cell is reduced at a temperature of 500° C. to 650° C.

It is preferable that the reduction temperature for the anode layer be keep as low as possible within the ranges described above, while still achieving sufficient oxygen removal and conductivity. Low reduction temperature is preferred because other layers in the fuel cell may be susceptible to temperature, thus resulting in, for example, atomic diffusion, annealing, and/or phase changes within or between the other layers. Preferably, the sintering of the electrolyte and cathode layers results in the their ideal and final microstructure Atomic diffusion, annealing, and/or phase changes after the sintering of the other layers may result in less than optimal conductivity for these layers and a reduction in the operating efficiency for the completed fuel cell. For example, atomic diffusion and/or phase change may result in the formation of defects, such as cracks, within the other layers. Furthermore, the anode layer itself may be susceptible to annealing, atomic diffusion, and/or phase changes during reduction. Preferably, the sintering (either full sintering in S1515 or co-sintering with electrolyte layer 130) of the anode layer results in the anode layer's ideal and final microstructure. A high reducing temperature that alters this microstructure may be detrimental to the conductivity of the anode layer and the operating efficiency of the fuel cell.

It will be appreciated that, in addition to reducing the anode layer, additional processing steps may be performed on the completed fuel cell. Preferably, any additional processing steps are not performed at temperatures that exceed 850° C. More preferably, any additional processing steps are not performed at temperatures that exceed 650° C. Additional processing temperatures may be performed at any appropriate temperature, including temperatures as low as 0° C. Preferably, the operating temperature of the SOFC does not exceed 850° C. More preferably, the operating temperature of the SOFC does not exceed 650° C. Preferably, the operating temperature of the SOFC is at least 300° C. to ensure efficient of the SOFC. Most preferably, the operating temperature of the SOFC is between 300° C.-650° C.

In some embodiments, anode layer 120 of the completed fuel cell is not reduced in S1540, but is reduced in-situ instead. In other words, anode layer 120 is reduced during fuel cell operation. Since the anode layer is capable of being reduced at a temperature no higher than the processing temperature, in-situ reduction of anode layer 120 is possible. In-situ reduction of anode layer 120 of the completed fuel cell decreases processing costs.

An exemplary method of fabricating an intermediate- or low-temperature solid oxide fuel cell 110 by co-sintering anode layer 120 and electrolyte layer 130 according to one embodiment will now be described with reference to FIG. 15B. In the method of FIG. 15B, anode layer 120 is not pre-sintered prior to the introduction of electrolyte layer 130. First, in step S1550 anode layer 120 is formed. Anode layer 120 is formed, for example, by preparing a green body having the desired oxide composition. After anode layer 120 is formed, electrolyte layer 130 is laminated or deposited on anode layer 120 in S1555. Electrolyte layer 130 may be laminated on anode layer by, for example, forming a green tape for the electrolyte layer having the desired composition and layering it onto anode layer 120. Electrolyte layer 130 may be deposited on anode layer 120 by, for example, mixing and coating a slurry on anode layer 120, although any suitable method may be used.

After electrolyte layer 130 is laminated or deposited in S1555, anode layer 120 and electrolyte layer 130 are heat treated in S1560, the heat treatment including at least a co-sintering step for co-sintering anode layer 120 and electrolyte layer 130. In some embodiments, anode layer 120 and electrolyte layer 130 are co-sintered at a temperature between 900° C.-1500° C. Preferably, anode layer 120 and electrolyte layer 130 are co-sintered at a temperature between 1200° C.-1300° C.

In some embodiments, a second electrolyte layer, such as, for example, second electrolyte layer 232 as described with reference to FIG. 2A may be laminated or deposited in S1565 and heat treated in S1570, the heat treatment including at least a co-sintering step for co-sintering anode layer 120, electrolyte layer 130, and second electrolyte layer 232 in S1570. It will be appreciated that second electrolyte layer 232 may be composed of the same material or a different material than electrolyte layer 130. In some embodiments, anode layer 120, electrolyte layer 130, and second electrolyte layer 232 are co-sintered at a temperature between 900° C.-1500° C. Preferably, anode layer 120, electrolyte layer 130, and second electrolyte layer 232 are co-sintered at a temperature between 1200° C.-1300° C.

After either S1555 or S1575, cathode layer 140 is fabricated on electrolyte layer 130 or second electrolyte layer 232 in steps S1575 and S1580. In S1575, cathode layer 140 is deposited on electrolyte layer 130 by, for example, mixing and coating a slurry on electrolyte layer 130. After cathode layer 140 is deposited, it is heat treated in S1580, the heat treatment including at least a sintering step. In some embodiments, cathode layer 140 is sintered at a temperature between 700° C.-1200° C. Preferably, cathode layer 140 layer is sintered at a temperature between 1000° C.-1100° C. After the cathode layer is sintered and cooled, a complete fuel cell (i.e. anode layer, electrolyte layer/bilayer, and cathode layer) is formed.

After S1580, the anode layer of the completed fuel cell may be subject to a reduction process as described in S1540 above. Alternatively, the anode layer of the completed fuel cell may be reduced in-situ.

While FIGS. 15A and 15B illustrate two specific ways in which layers may be sintered or co-sintered, any suitable combination of separate sintering of layers and co-sintering of layers may be used, with or without pre-sintering.

Functional Layers/Barrier Layers

While SVT and SNNV have high conductivity (as high as 300 S/cm at 650° C. for SNNV30 ($Sr_{0.2}Na_{0.8}Nb_{0.7}V_{0.3}O_3$)), vanadium (V) and/or sodium (Na) can migrate from the SVT or the SNNV to an electrolyte layer during sintering. This can result in electronic leakage and dropping of open circuit voltage (OCV) during the SOFC operation. This can be mitigated using functional/barrier layers that are configured to block the migration of vanadium and/or sodium from the anode layer into layers in contact with the anode layer, such as an electrolyte layer, an anode functional layer, or a metallic contact layer. In some embodiments, the functional/barrier layer blocks the migration of vanadium. In some embodiments, the functional/barrier layer blocks the migration of sodium. In some embodiments, the functional/barrier layer blocks the migration of both vanadium and sodium.

Figure 16:
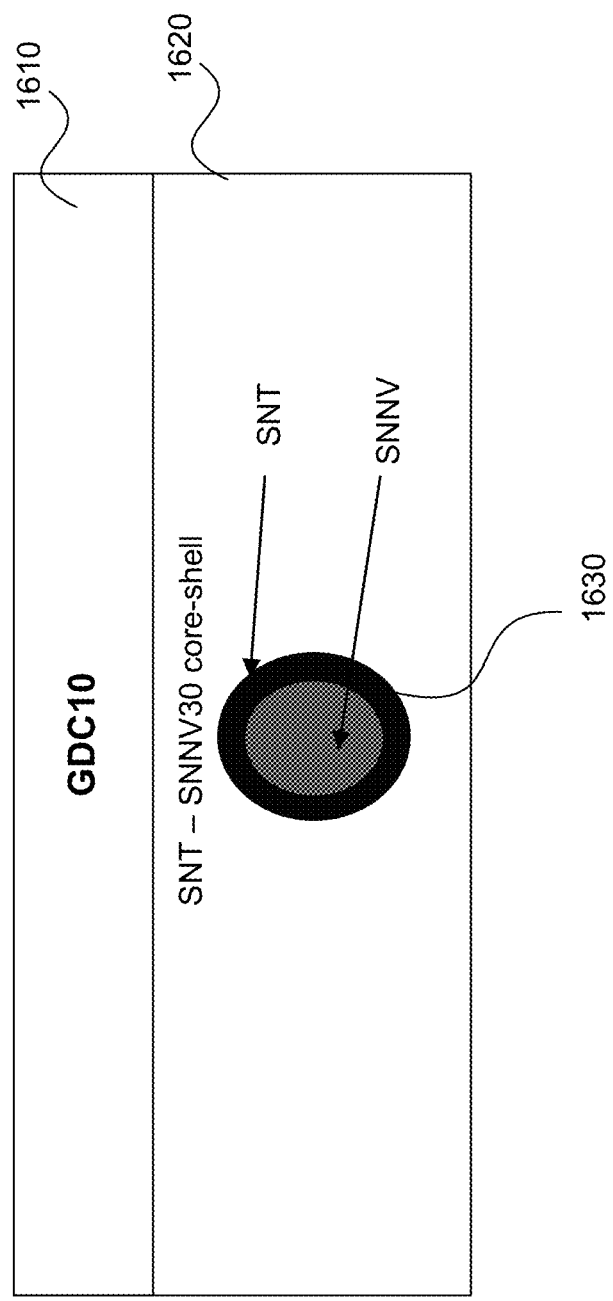
FIG. 16 shows a schematic sketch an anode composed of SNT-coated SNNV particles according to one embodiment.

In some embodiments, a chemically stable ceramic, such as niobium-doped strontium titanate (SNT) ($Sr_{0.94}Ti_{0.9}Nb_{0.1}O_3$), coated on the surface of SNNV particles can prevent the migration of V and Na into an electrolyte layer. FIG. 16 shows a schematic of an SNT coated SNNV particle 1630 according to one embodiment. FIG. 16 shows an electrolyte layer 1610 composed of GDC10 and an anode layer 1620 made using particles 1630 of SNNV30 coated within a layer of SNT.

In some embodiments, particles 1630 were fabricated using the following method. SNT, prepared using a sol gel method, was coated on SNNV30. Stoichiometric amounts of strontium carbonate, titanium isopropoxide, niobium oxalate were dissolved in citric acid monohydrate (chelating agent) and hydrogen peroxide (accelerator). The reaction was stopped in a sol gel state (before the formation of gel) and already prepared SNNV particles were added to the SNT precursor and heat treated at a temperature between 1000-1300° C. for 3 hours in air. After the heat treatment, the particles were analyzed using x-ray diffraction.

Figure 17:
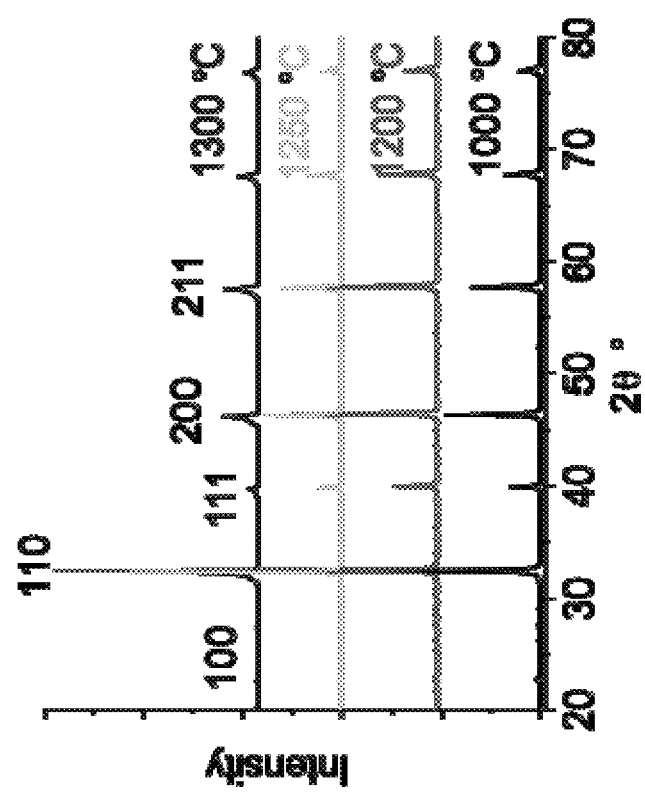
FIG. 17 shows and x-ray pattern of SNT coated SNNV particles according to one embodiment.
Figure 18A:
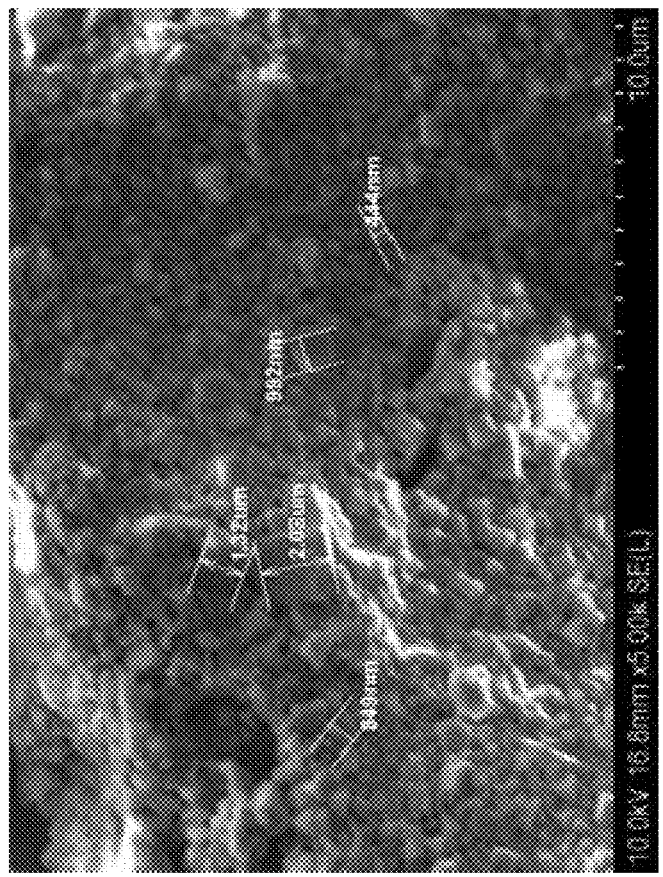
FIG. 18A shows and SEM image of SNT coated SNNV particles according to one embodiment.
Figure 18B:
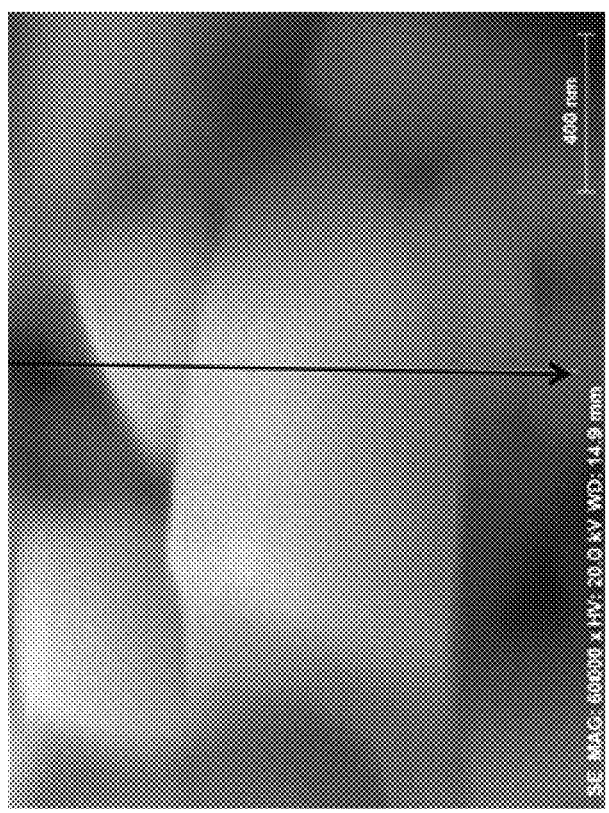
FIG. 18B shows an SEM image of a single particle from FIG. 18A.
Figure 18C:
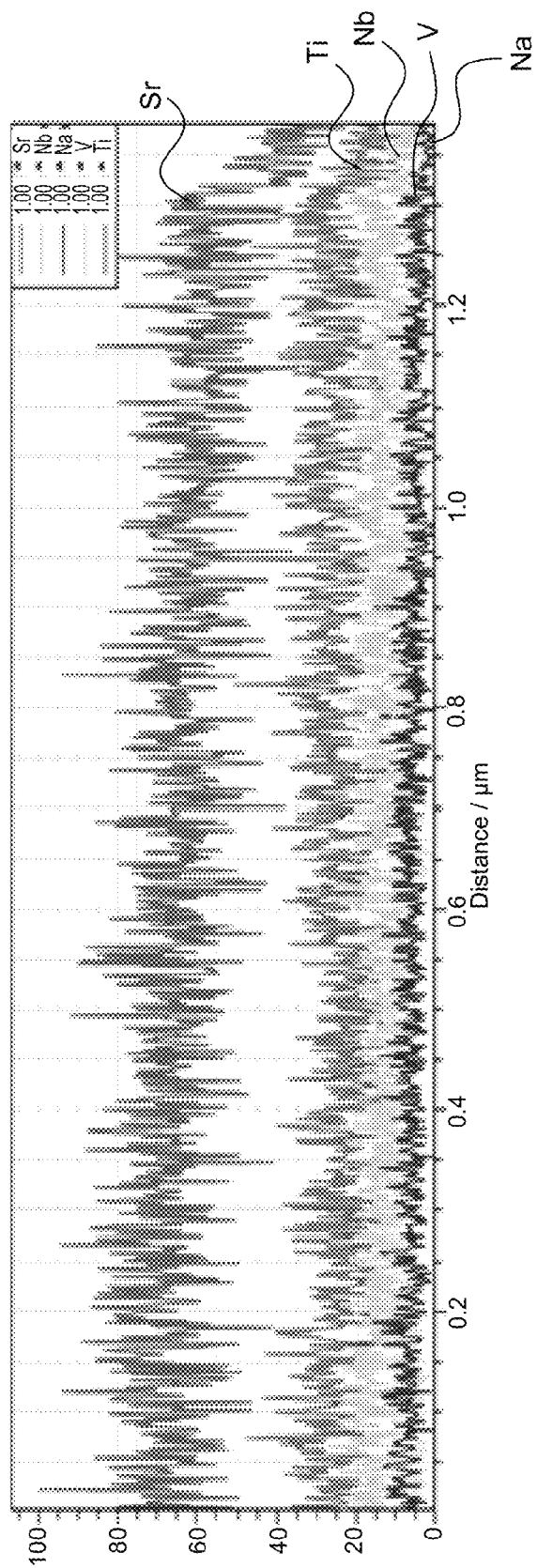
FIG. 18C show the energy dispersive spectroscopy (EDS) analysis of the particle in FIG. 18B.
Figure 19:
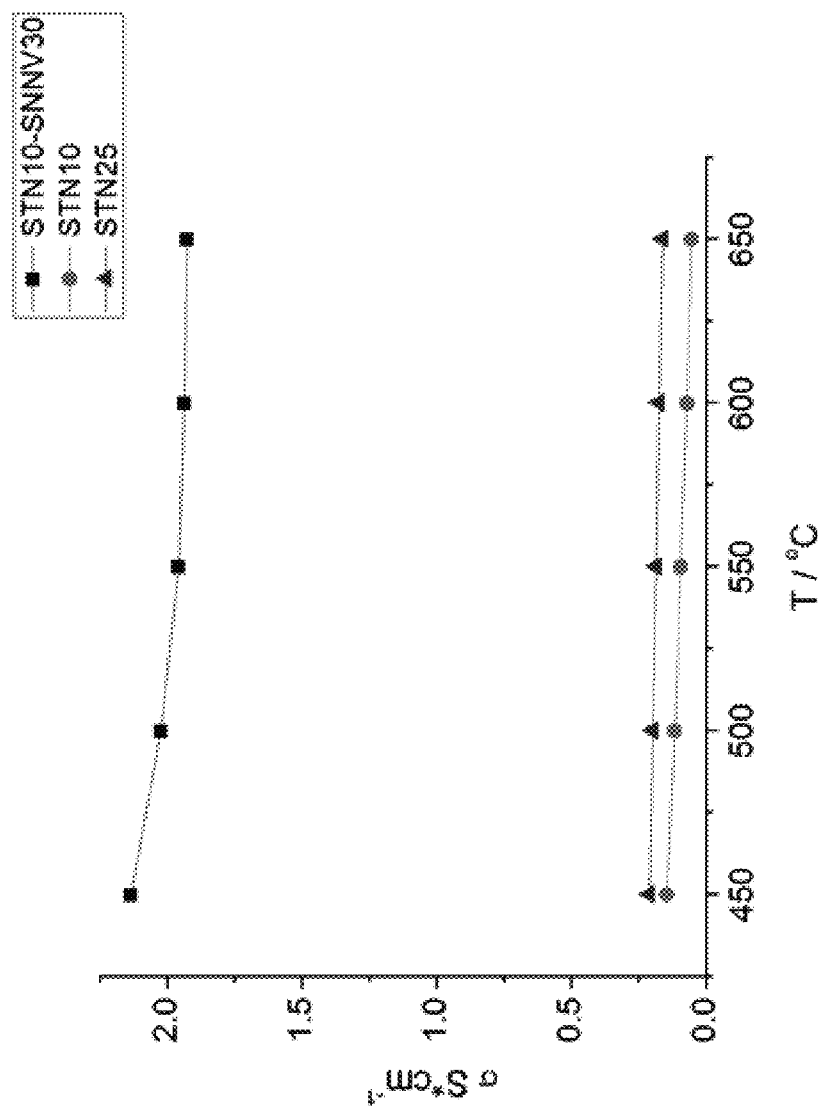
FIG. 19 shows the DC conductivity results of different SNT compositions and SNT coated SNNV.
Figure 20:
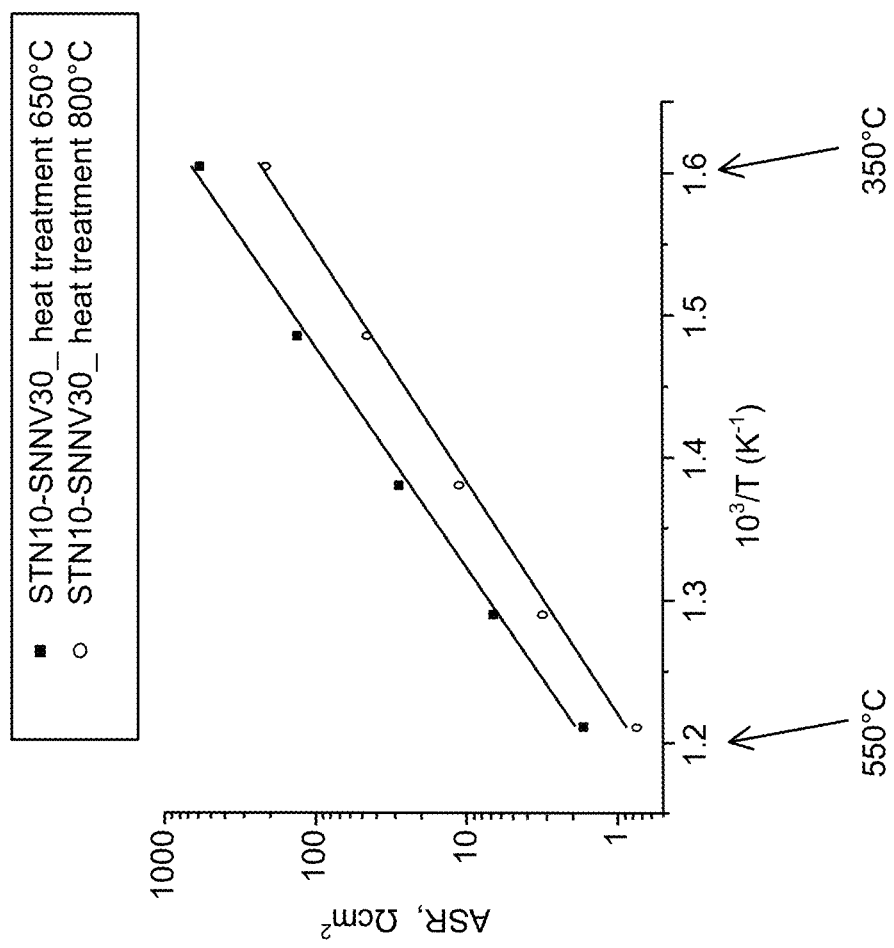
FIG. 20 shows a graph of the area specific resistance of Ni-GDC infiltrated SNT coated SNNV measured in wet $H_2$.
Figure 21:
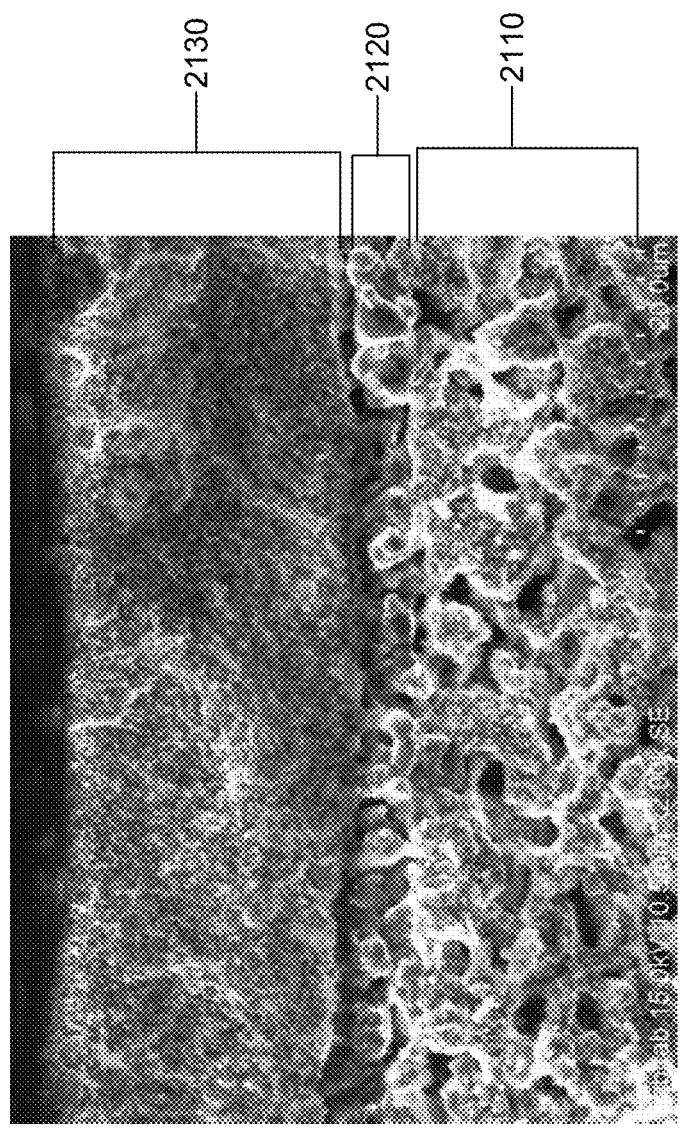
FIG. 21 shows a SEM image of a porous functional layer between a porous anode and a electrolyte according to one embodiment.
Figure 22:
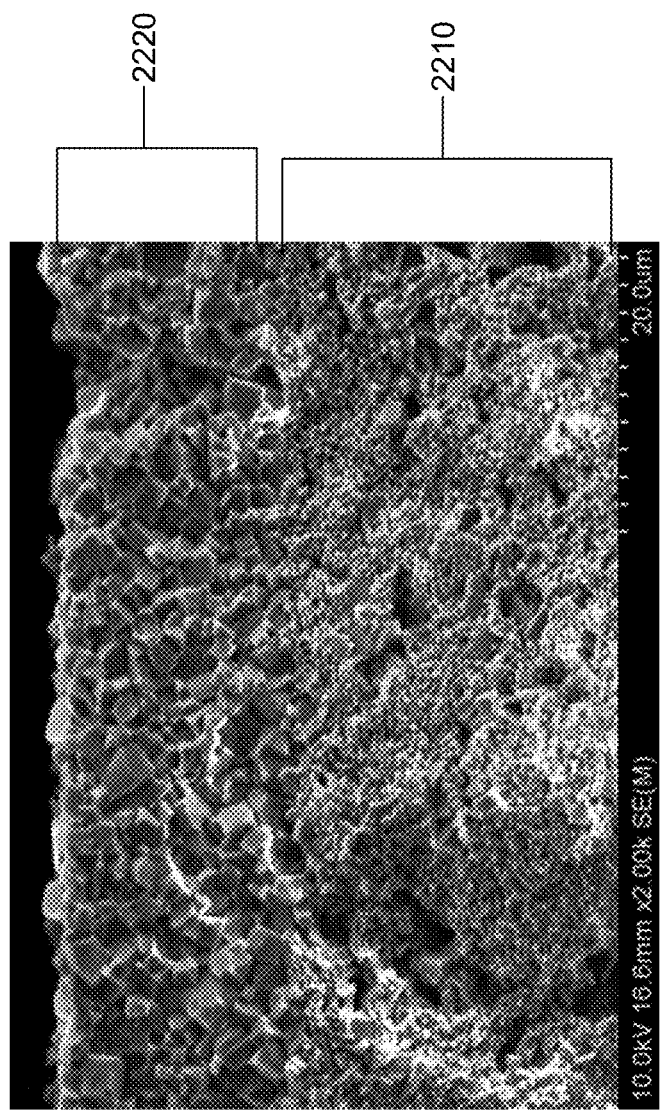
FIG. 22 shows a SEM image of a porous functional layer on the surface of a porous anode support according to one embodiment.

As shown in FIG. 17, the x-ray diffraction pattern for particles 1630 heat treated at 1000° C., 1200° C., 1250° C., and 1300° C. shows that SNT is coated on the surface of the particles 1630. The peaks of the x-ray pattern in FIG. 17 show the lattice parameters for SNT, without any secondary peaks, thus indicating the presence of SNT on the surface of particles 1630. An SEM image of the SNT coated SNNV30 particles is shown in FIG. 18A and a SEM image of a single particle in FIG. 18A is shown in FIG. 18B. An electron dispersive spectroscopy (EDS) analysis of the SNT-coated SNNV particle in FIG. 18B is shown in FIG. 18C. Each line in FIG. 18C represents the amount of an element (Sr, Nb, No, V, Ti) present in the particle when moving through the particle. The EDS in FIG. 18C also shows the presence of SNT (Sr, Nb, Ti) and the lack of vanadium (V) on the surface of the particle, i.e. the first 1.2 um of the SNT-coated SNNV particle.

The conductivity of particles 1630 was also measured. As shown in FIG. 19, the conductivity of SNT-SNNV particles 1630 was higher than that of two different compositions of pure SNT, namely $Sr_{0.94}Ti_{0.9}Nb_{0.1}O_3$ (SNT 10) and $SrTi_{0.75}Nb_{0.25}O_3$ (SNT 25).

In comparison to the SNNV compositions discussed above, the performance of SNT coated SNNV was poor, due to inactive SNT for electrochemical oxidation of fuels on the surface of the SNNV particles. Therefore, Ni-GDC (approx. 4 wt. %) was infiltrated into the symmetrical cells (i.e. pores) of an anode layer composed of SNT coated SNNV particles. The polarization resistance (area specific resistance, ASR) of an infiltrated anode layer was examined at two different temperatures (650° C. and 800° C.) and FIG. 20 shows a graph of ASR versus temperature. The infiltration of a material such as Ni-GDC improves the conductivity of the anode layer and improves the performance of the fuel cell. It is believed that these improvements are the result of a material such as Ni-GDC incorporating electronic and ionic conductivity in to the anode layer, which increases the catalytic activity thus leading to an enhanced triple phase boundary. The ASR for SNT coated SNNV30 particles is less at a reduction temperature of 800° C. mainly due to the increased electronic conductivity of SNT in the reducing gas conditions (typically anode operating conditions of higher temperature SOFCs). While the above example uses Ni-GDC as the infiltration material, other materials can be used. Other infiltration materials include other nickel based materials, such as elemental nickel and nickel composites.

The performance of the SNT coated SNNV can also be improved by limiting the thickness of the SNT coating. Preferably, the thickness of the coating is less than 250 nm. Limiting the thickness of the SNT coating facilitates electron percolation through the SNNV. If electrons are allowed to percolate though the anode layer via SNNV30, the conductivity of the anode layer is improved because the electrons do not have to pass though the less conductive SNT coating.

The migration of vanadium and/or sodium from the anode layer to an adjacent layer, e.g. an electrolyte layer, can also be mitigated by coating the surface of an anode layer with a barrier layer before the electrolyte layer is fabricated. For example, the surface of an anode layer composed of SNNV can be coated with a layer of SrO. This is expected to result in the formation of $SrVO_3$ on the surface of SNNV, which is proven to exhibit high electronic conduction and prevent carbon formation during fuel cell operation. In a fuel cell including a vanadium-doped anode layer and an electrolyte layer composed of GDC, $SrVO_3$ is unreactive to GDC at the interface between the anode layer and the electrolyte layer. Other materials that can be used as a barrier layer include, but are not limited to, perovskite type oxides or metal oxides, such as strontium titanate.

The migration of vanadium and/or sodium from the anode layer to the electrolyte layer can also be mitigated and the quality of the electrolyte film deposition can be improved by using compatible functional/barrier layers located between a SVT or SNNV anode layer and an electrolyte layer. The functional/barrier layers may be composites of electronic and ionic conductors, such as a composite of nickel (as shown in FIG. 21) or GDC or yttria-stabilized zirconia (YSZ) and SNT (as shown in FIG. 22). Materials that may be used for the barrier/functional layer include, but are not limited to, a nickel-GDC composite, a nickel-yttria stabilized zirconia composite, and a nickel-niobium doped strontium titanate composite. The individual components are selected for their ability to block vanadium and/or sodium migration without inhibiting the performance of the SOFC.

FIG. 21 shows an SEM image of a fuel cell 2100 fabricated with a barrier/functional layer 2120 according to one embodiment. Fuel cell 2100 includes a porous SNNV anode layer 2110 coated with barrier/functional layer 2120. Barrier/functional layer 2120 is porous Ni-GDC. Electrolyte layer 2130, composed of GDC is coated on top of barrier/functional layer 2120. FIG. 22 shows an SEM image of a partially completed fuel cell 2200 fabricated with a barrier/functional layer 2220 according to one embodiment. Partially completed fuel cell 2200 includes a porous SNNV anode layer 2210 coated with a porous YSZ—SNT barrier/functional layer 2220.

FIGS. 23A and 23B illustrate the concept of electron percolation through a composite material 2300. In both FIGS. 23A and 23B, composite material 2300 includes a first material 2310 and a second material 2320. For example, first material may be SNNV30 particles and second material 2320 may be SNT. As discussed above, SNNV30 is more conductive than SNT (see discussion of FIG. 16-20). As shown in both FIGS. 23A and 23B, there is a path for an electron to pass though composite material 2300 via only first material 2310. Since electrons are capable of passing though only first material 2310, the conductivity of composite material 2300 may have an overall conductivity close to that of first material 2310 because electrons do not have to pass through less conductive second material 2320. FIG. 23B illustrates that as the concentration of first material 2310 increases electrons have more percolation paths through the material, thereby increasing the conductivity of the composite material 2300.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A solid-oxide fuel cell comprising:
    a cathode layer;
    an electrolyte layer; and
    an anode layer comprising vanadium- and sodium-doped strontium niobate.

2. The solid oxide fuel cell of claim 1, wherein the anode layer is configured to allow electron percolation through the vanadium- and sodium-doped strontium niobate.

3. The solid oxide fuel cell of claim 1, wherein the vanadium- and sodium-doped strontium niobate has the formula:

$Sr_{0.2}Na_{0.8}Nb_{1-x}V_xO_{3\pm\delta}$; wherein x is within the following range:

$0.10 \leq x \leq 0.30$; and $0 \leq \delta \leq 1.5$.

4. The solid oxide fuel cell of claim 1, wherein the vanadium- and sodium-doped strontium niobate is doped with 10 to 30 at % vanadium at the niobium site.

5. The solid oxide fuel cell of claim 1, wherein the vanadium- and sodium-doped strontium niobate is doped with 20 to 30 at % vanadium at the niobium site.

6. The solid oxide fuel cell of claim 1, wherein the anode layer has a conductivity between 100-300 $S*cm^{-1}$ when reduced at a temperature between 300° C.-650° C. when the conductivity is measured at 650° C.

7. The solid oxide fuel cell of claim 1, wherein the anode layer further comprises GDC.

8. The solid oxide fuel cell of claim 1, wherein the anode layer comprises a crystal structure and wherein the crystal structure of the anode layer is perovskite.

9. The solid oxide fuel cell of claim 1, wherein the anode layer includes only oxide materials.

10. The solid oxide fuel cell of claim 1, wherein the anode layer is porous.

11. The solid oxide fuel cell of claim 1, further comprising a barrier layer disposed between the electrolyte layer and the anode layer, the barrier layer configured to block migration of a material from the anode layer, the material selected from the group consisting of: vanadium, sodium, or combinations thereof.

12. The solid oxide fuel cell of claim 11, wherein the barrier layer comprises a perovskite type oxide or metal oxide.

13. The solid oxide fuel cell of claim 11, wherein barrier layer comprises strontium titanate.

14. The solid oxide fuel cell of claim 11, wherein the barrier layer comprises strontium oxide.

15. The solid oxide fuel cell of claim 11, wherein the barrier layer comprises a composite selected from the group consisting of: a nickel-GDC composite, a nickel-yttria stabilized zirconia composite, and a nickel-niobium doped strontium titanate composite.

16. The solid oxide fuel cell of claim 1, wherein the anode layer comprises a composite including niobium doped strontium titanate and vanadium- and sodium-doped strontium niobate; and
    wherein the niobium doped strontium titanate is configured to block migration of a material from the anode layer, the material selected from the group consisting of: vanadium, sodium, or combinations thereof.

17. The solid oxide fuel cell of claim 16, wherein the anode layer is infiltrated with Ni or Ni-GDC.

18. An oxide composition comprising: $Sr_{0.2}Na_{0.8}Nb_{1-x}V_xO_{3\pm\delta}$; wherein x is within the following range:

$0.10 \leq x \leq 0.30$; and $0 \leq \delta \leq 1.5$.

19. The oxide composition of claim 18, wherein x is within the range: $0.20 \leq x \leq 0.30$.

20. The oxide composition of claim 18, wherein the oxide composition comprises a crystal structure and wherein the crystal structure of the oxide composition is perovskite.

* * * * *